US012499376B2

(12) United States Patent
Rangan

(10) Patent No.: US 12,499,376 B2
(45) Date of Patent: Dec. 16, 2025

(54) METHOD AND SYSTEM FOR DETERMINING BEHAVIORAL PATTERNS OF USER GROUPS BASED ON INTERACTIONS WITH OTHER USER GROUPS USING MACHINE LEARNING

(71) Applicant: Clari Inc., Sunnyvale, CA (US)

(72) Inventor: Venkat Rangan, Los Altos, CA (US)

(73) Assignee: CLARI INC., Sunnyvale, CA (US)

( * ) Notice: Subject to any disclaimer, the term of this patent is extended or adjusted under 35 U.S.C. 154(b) by 1099 days.

(21) Appl. No.: 17/180,418

(22) Filed: Feb. 19, 2021

(65) Prior Publication Data

US 2022/0269957 A1  Aug. 25, 2022

(51) Int. Cl.
*G06N 20/00* (2019.01)
*G06F 16/28* (2019.01)
*G06N 5/04* (2023.01)
*G06N 7/01* (2023.01)

(52) U.S. Cl.
CPC ............ *G06N 5/04* (2013.01); *G06F 16/285* (2019.01); *G06N 7/01* (2023.01); *G06N 20/00* (2019.01)

(58) Field of Classification Search
CPC . G06N 5/04; G06N 7/01; G06N 20/20; G06F 16/285; G06F 16/95
See application file for complete search history.

(56) References Cited

U.S. PATENT DOCUMENTS

| 11,263,241 B2* | 3/2022 | Rezaeian | G06F 16/285 |
| 11,753,019 B2* | 9/2023 | Samarthyam | G06N 3/02 |
| | | | 701/1 |
| 2018/0268337 A1* | 9/2018 | Miller | G06Q 10/063114 |

OTHER PUBLICATIONS

Aksu et al., The Effect of the Normalization Method Used in Different Sample Sizes on the Success of Artificial Neural Network Model, 2019, International Journal of Assessment Tools in Education. 6. pp. 170-192, 10.21449/ijate.479404. (Year: 2019).*

(Continued)

*Primary Examiner* — David R Vincent
(74) *Attorney, Agent, or Firm* — WOMBLE BOND DICKINSON (US) LLP

(57) ABSTRACT

The disclosure describes a method of generating a target profile including the target's sequence of events (SOE) for a task. Such target profile sequence of events is derived from several source group's transactions, where any source group's transactions cannot be shared with other source groups but the derived target group's profile is the only information that is shared. Source-side information is periodically extracted for a plurality of sources that each interact with a plurality of targets. The information includes source stages, resources, and stage transition events for a task with a target. Source information is used to generate a set of normalized stages, and a set of normalized events for transitioning between the stages of the set of normalized stages. An artificial intelligence (AI) model is trained using the source information. The AI model can generate a target profile with target process information inferred using the trained model. The target process information can include the target's identifiers for each stage, an estimated duration of the stage, deliverables for the stage, and one or more stage transition events for the stage.

22 Claims, 14 Drawing Sheets

(56) References Cited

OTHER PUBLICATIONS

Squicciarini et al., CoPE: Enabling Collaborative Privacy Management in Online Social Networks, 2011, JASIST. 62., pp. 521-534, 10.1002/asi.21473. (Year: 2011).*

Trusov et al., "Crumbs of the Cookie: User Profiling in Customer-Base Analysis and Behavioral Targeting", May-Jun. 2016, Marketing Science, vol. 35, No. 3, pp. 405-426, https://www.jstor.org/stable/44012162 (Year: 2016).*

Chamoso et al., "Profile generation system using artificial intelligence for information recovery and analysis", Apr. 15, 2020, Journal of Ambient Intelligence and Humanized Computing, vol. 11, pp. 4583-4592 (Year: 2020).*

* cited by examiner

1000 Target Profile Features

| 1010 Feature Category | 1020 Value Metrics | 1030 Description |
|---|---|---|
| 1011 Target Stage Metrics | Target Process stages<br>Target Process Stage Duration<br>Target Process Stage Transition Probability | Derived from progression of Source's task timeline |
| 1012 Target Purchasing Group | Target Committee | Sponsor, User, Approver, Signer, Implementation contacts Derived from Contacts in Source's task timeline |
| 1013 Target Process Metrics | Proof of Concept<br>Assessment<br>Security Review<br>Evaluation Criteria | Derived from deliverables and stage progression of Source's task timeline |
| 1014 Target Product Groups | Product mix<br>Unit capacity<br>Expansion/Growth | Adjacent product purchase probability, Unit expansion trends, Usage trends, using Source task timeline from a plurality of Sources and a particular Target and/or similar Targets and trained AI model. |

FIG. 10A

METHOD AND SYSTEM FOR DETERMINING BEHAVIORAL PATTERNS OF USER GROUPS BASED ON INTERACTIONS WITH OTHER USER GROUPS USING MACHINE LEARNING

TECHNICAL FIELD

Embodiments of the present invention relate generally to machine learning. More particularly, embodiments of the invention relate to machine learning of behavioral patterns of user groups.

BACKGROUND

As the Internet has been widely utilized, users communicating with each other over the network become more popular. Efforts have been made to analyze the user behavior to predict future actions of the users that are likely to be performed. Typically, in order to determine the user behavioral pattern, the user or its data has to be accessed and analyzed. There are no other efficient ways to obtain the same without contacting the specific user.

BRIEF DESCRIPTION OF THE DRAWINGS

Embodiments of the invention are illustrated by way of example and not limited to the figures of the accompanying drawings in which like references indicate similar elements.

FIG. 10A is a block diagram illustrating features of a target user group profile that can be predicted using an AI model that is trained using source's activity data that is processed to generate event history that is used to train the AI model according to one embodiment.

DETAILED DESCRIPTION

Figure 1A:
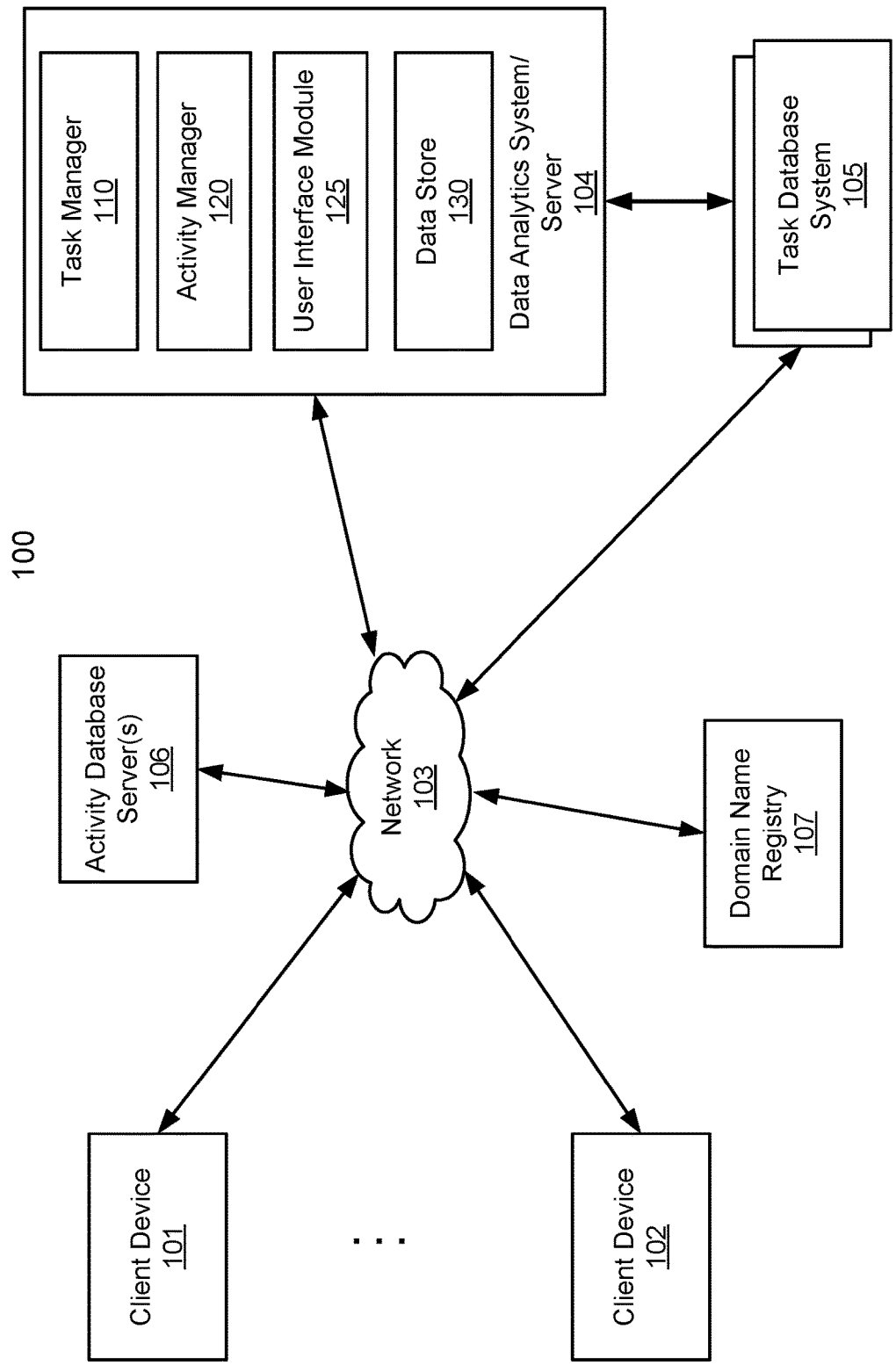
FIGS. 1A and 1B are block diagrams illustrating a network configuration according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" or "in an embodiment" in various places in the specification do not necessarily all refer to the same embodiment.

According to one embodiment, periodically via a first thread executed by a first processor, processing logic obtains event data from a task database system. The event data includes a plurality of events of a plurality of tasks performed between a plurality of source user groups (also simply referred to as sources) and a plurality of target user groups (also simply referred to as targets), each task including a plurality of stages. Each event corresponds to an activity performed by a particular source user group on a particular task with respect to a particular target user group within a predetermined time period in the past. Processing logic normalizes the plurality of events and the stages of the plurality of tasks using a predetermined normalization algorithm. Processing logic extracts a set of task features of the plurality of tasks from the event data. The set of task features identifying stages of each task and timing information from one stage to another stage of each task. An artificial intelligence (AI) model is trained using the extracted set of task features as a training set of data.

In addition, according to one embodiment, via a second thread executed by a second processor, a request is received from a user group that has no prior transactions with the target user group, for profiling a first target user group from a client device over a network. In response to the request, processing logic retrieves from the task database system a set of real-time event data corresponding to a set of recent events performed by one or more first source user groups on one or more tasks with respect to the first target user group. Importantly, the source user groups do not have any knowledge of the other source groups and how their transactions and the stage progression of transactions are structured and executed against the target user group. The AI model is applied to a set of real-time task features extracted from the recent events from all the source user groups that have prior transactions with the target group, to generate a first user group profile describing a behavioral pattern of the first user target group. The first user group profile is transmitted to the client device over the network.

In one embodiment, the set of task features extracted from the event data includes a user identifier (ID) of each user of each source user group involved in each stage of each task and a user role of each user. The set of task features extracted from the event data further includes a completion rate of past tasks involved by each user of each source user group. The set of task features extracted from the event data comprises duration of each stage of each of the plurality of tasks. The set of task features extracted from the event data comprises a size of each task and a completion rate of the tasks.

According to another embodiment, the set of task features extracted from the event data includes a date and time stamp indicating when a piece of information in the event data was updated by a member of a corresponding source user group. Normalizing the plurality of events and the stages of the plurality of tasks includes: for each of the source user groups, determining a greatest number of stages in a task process associated with the source user group; determining an average number of stages across the plurality of source user groups using the determined greatest number of stages for each source user group; and generating a set of normalized stages having the determined average number of stages.

In one embodiment, for each stage in the task process of each source user group, one or more events that are required to advance the task process to a next stage in the task process are determined. The set of normalized events for transitioning to a next stage of the set of normalized stages is determined, using the determined events for each stage in the task process of each source user group. For each of one or more stages of the task process of each source user group, the stage is matched to a stage in the set of normalized stages by matching an event in the one or more events that are required to advance the task process of the source user group to an event in the set of normalized events that is associated with the matching stage in the set of normalized stages.

In one embodiment, the first target user group profile comprises a projected duration of each stage of a potential task involved by the first target user group and a probability of advancing to a next stage of the potential task. The first target user group profile includes: a trend in change of duration of a transition time between one or more of the normalized stages; one or more outlier instances in a change of the duration of a transition time between one or more of the normalized stages; or a seasonality of the duration of a transition time between one or more of the normalized stages. The task database system is configured to store task activity data for the source user group and accessible by the source user groups, and wherein the first target user group profile is determined without having to contacting the first target user group. The AI model includes at least one of a hidden Markov model, an echo state network, or a Bayesian network.

FIG. 1A is a block diagram illustrating a network configuration according to one embodiment of the invention. Referring to FIG. 1A, system 100 includes, but is not limited to, one or more client systems 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc.

In one embodiment, data analytics system or server 104 (also referred to as a data management such as task/project management system or server) provides task/project management and/or data analytics services to clients 101-102 based on task data provided by task database system 105 as a data source. Note that although there is only one task database system shown, multiple database systems may also be implemented, where management system 104 may be implemented as a multi-tenancy system that can access multiple database systems concurrently over network 103. For example, a user of client device 101 may be associated with a first organization as a first corporate client to management system 104, while a user of client device 102 may be associated with a second organization as a second corporate client to management system 104. The first and second organizations may employ different ones of database systems 105.

In one embodiment, management system 104 includes, but it is not limited to, task manager 110, activity manager 120, and data store 130. The management system 104 may further include a user interface (not shown), which can be any kind of user interface (e.g., Web, graphical user interface or GUI, an API, or command line interface or CLI) that allows users of client devices 101-102 to access the services provided by project management system 104. In one embodiment, such a service may include initiating or scheduling processing threads to determine a user group profile of a particular user group based on the activities of other user groups that interactive with that particular user group (referred to as a target user group). The activity data can be retrieved from task database system 105 and/or activity database system 106 associated with the other user groups (referred to as source user groups). The user group profile of a target user group can be determined based on the data provided by the source user groups, without having to contact the target user group.

Data store 130 stores or caches data of a variety of tasks or activities, which may be periodically updated from the corresponding data source(s) or data provider(s), in this example, database systems 105-106. Alternatively, task manager 110 and/or activity manager 120 may directly access database systems 105-106 to query and retrieve the corresponding task and activity data. Data stored in data store 130 can be maintained in a variety of data structures, such as tables or databases. Task manager 110 and/or activity manager 120 can access data store 130 via a variety of application programming interfaces (APIs), database queries, or other suitable communication protocols (e.g., structured query language or SQL).

According to one embodiment, task manager 110 is configured to communicate and interact with task database system 105 to obtain task information of tasks maintained in task database system 105. Task manager 110 can communicate with task database system 105 via an API and/or using a communication protocol. For a given user of a user group, task manager 110 can communicate with task database system 105 to retrieve a list of tasks that are associated with the user or the user group. A user can be an owner of a task, a team member of a team or user group that manages the task, or a manager of owners or teams/user groups of tasks. For a given task, task manager 110 can also obtain properties or attributes of the task from task database system 105 as a part of task information. Task manager 110 is configured to communicate with task database system(s) 105 using a variety of APIs or protocols compatible with task database system(s) 105. Similarly, activity manager 120 can communicate with activity database system to retrieve activity data. For example, activity database system 106 may be an email server or a calendar server that maintains activities such as emails and/or meetings, etc.

In one embodiment, activity manager 120 accesses activity database system 106 to retrieve a list of events or event objects of the activity database system 106. The event objects may be associated with certain activities of activity database system 106 such as calendar events. For each of the event objects, activity manager 120 determines or extracts one or more participant or user identifiers (IDs) from the event object. The participant IDs identify one or more participants or users participating an event or activity (e.g., exchanged emails, meetings) associated with the event object. For each of the participant IDs, activity manager 120 extracts a domain ID from the participant ID.

Based on the domain ID, task manager 110 identifies a list of one or more entity objects based on the domain ID, where the entity objects are stored in task database system 105. An entity object may be associated with an account, a department, a unit, or a division of a corporate or enterprise client. A user group throughout this application may represent a group of users or members of an entity. In one embodiment, task manager 110 may identify one or more contact objects that have a contact of a user (e.g., email address) matching the domain ID. Task manager 110 then identifies the entity objects that the contact objects belong. At least one attribute of at least one of the entity objects is modified by the task manage 110 based on the participant ID and the domain ID, which generates a modified entity object. For example, contact information of a participant of the event may be updated for the entity object. Any entity objects that have been modified are transmitted to the task database system 105 for update.

In addition, for each task object of each entity object, task manager 110 determines whether a participant ID of a participant matches a user of a user group associated with the task object. A task object contains information describing a particular task, which is configured to be performed by a user or a group of users. If so, at least one attribute of the task object is updated or modified. For example, contact information of the matching user of the task object is updated based on the event object. As a result, certain data of activity database 106 and task database 105 can be automatically synchronized.

Figure 1B:
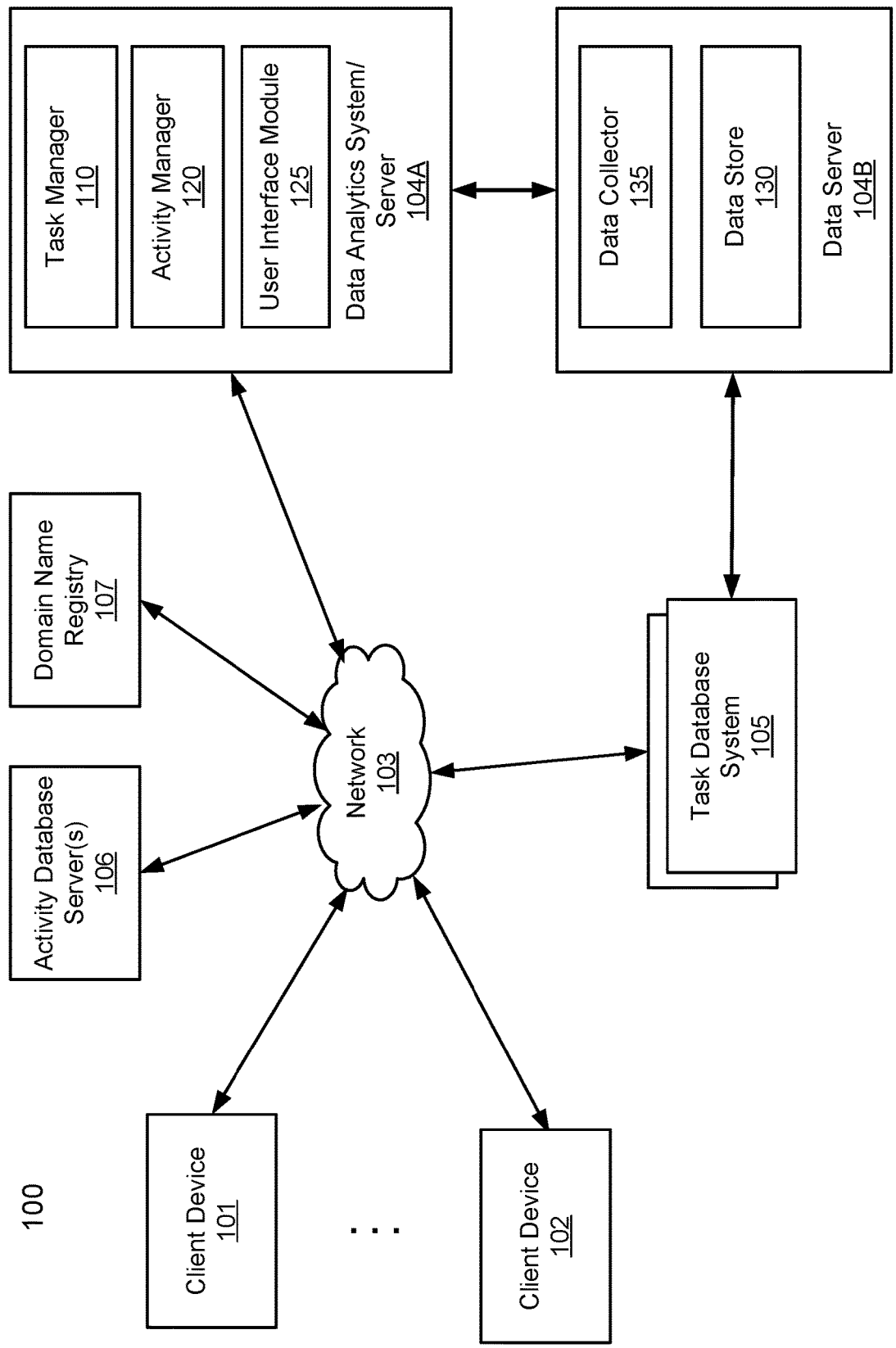

Although in this embodiment, data store 130 is maintained by management system 104, however, data store 130 can be maintained in a dedicated data server that is a separate server from management server 104 as shown in FIG. 1B. Referring now to FIG. 1B, in this embodiment, management server 104A and data server 104B are implemented as separate servers, which may be operated by the same or different organizations or entities. Data store 130 is now maintained by data server 104B. Data server 104B further includes data collector 135 configured to periodically or constantly collect or update task data from data sources 105 and/or 106. Task data collected from a first data source cannot be access by a user of a second data source. Target user groups do not share their data with source user groups. The management server 104A communicates with data server 104B using a variety of communication protocols to access task data stored in data store 130.

Figure 2:
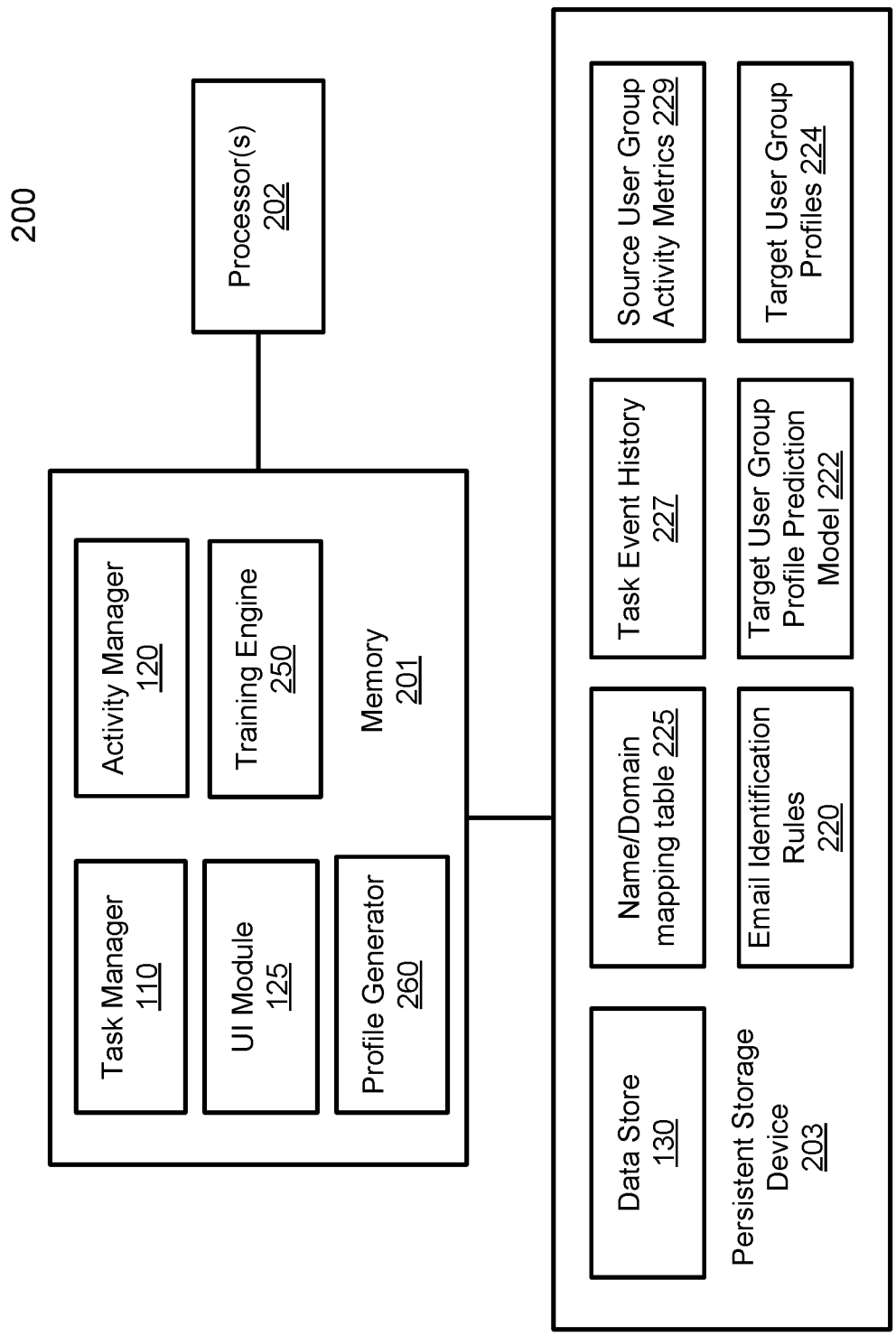
FIG. 2 further illustrates a data analytics system according to one embodiment.

FIG. 2 is a block diagram illustrating an example of a project management system according to one embodiment of the invention. System 200 may be implemented as part of management system or server 104. Referring to FIG. 2, system 200 includes task manager 110, activity manager 120, and user interface module 125 loaded in memory 201 (e.g., volatile memory such as random access memory or RAM) and executed by one or more processors 202 (e.g., microprocessors, central processing units or CPUs). Data store 130 is maintained in persistent storage device 203, such as a hard disk, which may be maintained locally or remotely over a network. At least a portion of data stored in data store 130 may be cached in memory 201.

Referring now to FIGS. 1A-1B and 2, according to one aspect of the disclosure, task manager 110 queries task database system 105 obtain a list of tasks that are associated with a particular entity (e.g., a user, a group of users, a client). Task database system 105 may be associated with or utilized by one or more user groups representing different entities. A user group can be a source user group that provides services to another user group (referred to as a target user group). A user group can include one or more users and each user may be associated with a specific user role within the user group. At least one of the user members may be a user group leader (e.g., a team leader or group manager).

For example, a user group leader of a user group such as a source user group having one or more user members can log into task management system 200 and retrieve a list of tasks that members of his or her user group are working with. In response to the request, task manager 110 communicates with task database system 105 to query for a list of the tasks. In one embodiment, task database system 105 is configured to store task activity data for one or more source user groups that provide services or products to one or more target user groups that wish to acquire the services or products.

Persistent storage 203 can include storage for task event history 227. Event history 227 can be generated by extracting task information from task database system 105 using one or more queries. In an embodiment, task event history 227 can be updated periodically, such as every 15 minutes. Task event history 227 can be used by training engine 250 to train an artificial intelligence (AI) model that predicts a user group profile of a target user group using information generated by one or more source user groups, without using information provided by the target user group. In an embodiment, the AI model can be trained periodically such as once per day, such as after hours when a computing system load may otherwise be light.

A user group profile can be generated by profile generator 260, periodically or in response to a request on demand in response to receiving a request from a user via UI module 125, by applying the AI model to a set of features extracted from the current or up-to-date task data retrieved from task database system 105. The target user group profile can be stored or cached in a target user group profiles storage 224. The trained AI model can be stored in target user group profile prediction model storage 222.

In one embodiment, when project manager 110 queries task database system 105, it sends a query request to task database system 105, where the query request includes certain parameters to specify one or more attributes of the tasks to be queried. In response, task database system 105 searches based on the query request to identify and retrieve the list of tasks that satisfy the query request. For example, task manager 110 can query task database system 105 by specifying that only the account contacts of a particular account should be retrieved or only the task contacts of a particular task should be retrieved, etc. Alternatively, task manager 110 may perform filtering of accounts and/or projects to identify the tasks.

According to one embodiment, periodically via a first thread executed by a first processor, processing logic, such as task manager 110 and/or activity manager 120, obtains event data from a task database system such as task database system 105. The event data includes a plurality of events of a plurality of tasks performed between a plurality of source user groups and a plurality of target user groups, each task including a plurality of stages. Each event corresponds to an activity performed by a particular source user group on a particular task with respect to a particular target user group within a predetermined time period in the past (e.g., past year or 6 months). Processing logic normalizes the plurality of events and the stages of the plurality of tasks using a predetermined normalization algorithm. Processing logic extracts a set of task features of the plurality of tasks from the event data. The set of task features identify stages of each task and timing information from one stage to another stage of each task. An artificial intelligence (AI) model is trained using the extracted set of task features as a training set of data.

In addition, according to one embodiment, via a second thread executed by a second processor, a request is received for profiling a first target user group from a client device over a network. In response to the request, processing logic retrieves from the task database system a set of real-time event data corresponding to a set of recent events performed by one or more first source user groups on one or more tasks with respect to the first target user group. The AI model is applied to a set of real-time task features extracted from the recent events to generate a first user group profile describing a behavioral pattern of the first user target group. The first user group profile is transmitted to the client device over the network. Note that the first processor and the second processor may be the same processor of the same system. Alternatively, the first processor and the second processor may be implemented in different systems (e.g., frontend system and backend system).

In one embodiment, the set of task features extracted from the event data includes a user identifier (ID) of each user of each source user group involved in each stage of each task and a user role of each user. The set of task features extracted from the event data further includes a completion rate of past tasks (e.g., closed deals) involved by each user of each source user group. The set of task features extracted from the event data comprises duration of each stage of each of the plurality of tasks. The set of task features extracted from the event data comprises a size of each task and a completion rate of the tasks.

According to another embodiment, the set of task features extracted from the event data includes a date and time stamp indicating when a piece of information in the event data was updated by a member of a corresponding source user group. Normalizing the plurality of events and the stages of the plurality of tasks includes: for each of the source user groups, determining a greatest number of stages in a task process associated with the source user group; determining an average number of stages across the plurality of source user groups using the determined greatest number of stages for each source user group; and generating a set of normalized stages having the determined average number of stages.

In one embodiment, for each stage in the task process of each source user group, one or more events that are required to advance the task process to a next stage in the task process are determined. The set of normalized events for transitioning to a next stage of the set of normalized stages is determined, using the determined events for each stage in the task process of each source user group. For each of one or more stages of the task process of each source user group, the stage is matched to a stage in the set of normalized stages by matching an event in the one or more events that are required to advance the task process of the source user group to an event in the set of normalized events that is associated with the matching stage in the set of normalized stages.

In one embodiment, the first target user group profile comprises a list of one or more stages of a potential task and a projected duration of each stage of the potential task involved by the first target user group, and a probability of advancing to a next stage of the potential task. The first target user group profile further includes a list of one or more members of the first target user group that are associated with a stage of the potential task. The first target user group profile includes: a trend in change of duration of a transition time between one or more of the normalized stages; one or more outlier instances in a change of the duration of a transition time between one or more of the normalized stages; or a seasonality of the duration of a transition time between one or more of the normalized stages. The task database system is configured to store task activity data for the source user group and accessible by the source user groups, and wherein the first target user group profile is determined without having to contacting the first target user group. The AI model includes at least one of a hidden Markov model, an echo state network, or a Bayesian network.

Note that the specific configuration of system 200 is described for illustration purpose only. Other configurations may exist. For example, some of the components such as training engine 250 may be maintained in a backend system (e.g., application server or backend server), where training engine 250 periodically train and/or update an AI model based on a set of task data history. Profile generator 260 may be maintained in a frontend system (e.g., Web server) to receive a request from a client device for profiling a user group (e.g., target user group) via UI module 125 and to generate a target user group profile based on the current or real-time task data of one or more source user groups that provide services to the target user group, using the periodically updated AI model by training engine 250. Alternatively, profile generator 260 may also be maintained in the backend system to periodically generate target user group profiles 224. In response to a request for user group profiling at real-time, UI module 125 can simply retrieve the already compiled user group profile from user group profiles 224 and return the same to the client device.

Figure 3:
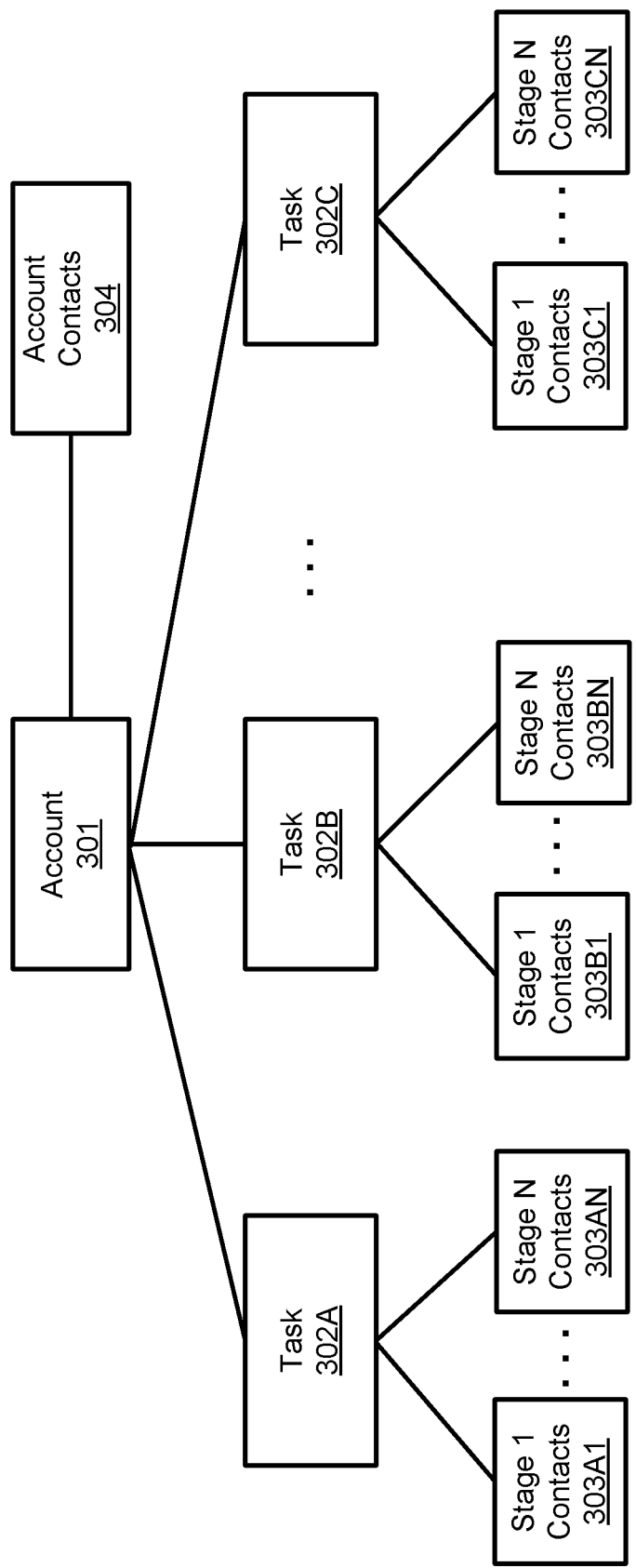
FIG. 3 illustrates an example of a source user group's stages during a task transaction according to one embodiment.

A client or a user group may be associated with an account maintained by task database system 105. Each account may include one or more tasks as shown in FIG. 3. Referring to FIG. 3, account 301 may be associated with one or more tasks 302A-302C. For example, account 301 may belong to a client or a user group that have potential projects or tasks 302A-302C concurrently being processed. Account 301 may be managed by one or more persons at an account level, referred to as account contacts 304. Each of tasks 302A-302C may be managed by one or more persons at a task level, referred to herein as task contacts, such as task contacts 303A-303C. Different users may be associated with the account contacts 304 of a source user group and different task contacts may be associated with different stages of the tasks 302A-C.

For example, task 302A may include stages 303A1 . . . 303AN. Different account contacts 304 (e.g. task management contacts, or source group contacts) may be associated with each stage of the task 302A and different task contacts may be associated with each stage 303A1 . . . 303AN of the task. Alternatively, a single user can be a part of both account contacts 304 and any one or more of task contacts 303A-303C. Each of account contact 304 and task stage contact 303A1 . . . 303AN, 303B1 . . . 303BN, 303C1 . . .

303CN may include one or more email addresses of the contact (e.g., a source email address and/or a target email address) and/or a Web site associated with the account or task. This contact information may be stored in task database system 105 and accessible via queries. Embodiments described herein can infer a transition to a next stage of the task by a change in one or more of the stage contacts 303A1 . . . N, 303B1 . . . 303BN and 303C . . . 303CN or activities by users of the corresponding source user groups (e.g., emails, calendar events obtained from activity database system 106).

For each of the tasks (e.g., projects 302A-302C of FIG. 3), referring back to FIGS. 1A-1B and 2, task manager 110 queries task database system 105 to obtain a first list of one or more contacts associated with the task, which can be a target contact or a source contact. A target contact refers to a person of a client or a target user group as a point of contact for a particular task that attempts to acquire or invoke a service or product. A source contact refers to a person associated with a source user group (e.g., a service provider or vendor) that provides task development for a client (e.g., a member of a task development team).

For each of the contacts in the first list, either being an account contact or a task contact, activity manager 120 determines a domain name based on contact information of the contacts (e.g., emails, Web addresses, name of an account associated with the contacts). A first set of email addresses, referred to as target email addresses, are determined based on the domain name and contacts using a set of email identification rules 220. A target email address refers to an email address associated with a target contact. An email server such as activity database system 106 is queried to retrieve a list of one or more emails and/or calendar events based on the first set of email addresses.

In one embodiment, if the contact information of a task includes the email addresses of the contacts, the email addresses may be directly used in identifying the activities or stages of a task. The domain name can be extracted from the email addresses, where the domain name can be used to identify other email addresses of the contacts. However, in some situations, the contact information stored in the task database system may not include an email address of the contact. In such a scenario, the domain name has to be derived from other information (e.g., name, notes, Web address, phone number, social network such as Facebook®, Twitter®, LinkedIn®, etc.) associated with the contact.

The email identification rules 220 may specify a preference or priority order indicating which of the contact information should be used in order to identify a domain name. For example, email identification rules 220 may specify that a project contact should be used to determine a domain name over the account contact, and the account contact will be used only if the task contact is unavailable, etc. Note that email identification rules 220 may be different for different clients, different accounts, and/or different projects. Email identification rules 220 may include a first set of rules for identifying source email addresses and a second set of rules for identifying target email addresses. Email identifying rules 220 may be configurable by an administrator via a configuration interface such as a command line interface (CLI) or Web interface.

In one embodiment, in determining a domain name associated with a client, an account, or a project, based on the data retrieved from the task database system 105 by project manager 110 and dependent upon email identification rules 220, activity manager 120 determines whether there is any task contact associated with the task. If there is a task contact associated with the task, activity manager 120 determines the domain name based on the task contact of the project. A task contact (e.g., task user role) refers to a person of a user group or client who specifically handles a particular task. The domain name may be derived from any contact information (e.g., name, notes, Web address, phone number, social network such as Facebook®, Twitter®, LinkedIn®, etc.) associated with the task contact. If there is no task contact associated with the task, activity manager 120 determines the domain name based on an account contact associated with an account to which the task belongs. The domain name may be obtained from an email address or other information of the account contact. In this example, email identification rules 220 associated with this task may specify that a task contact should be utilized over an account contact in determining a domain name.

In one embodiment, an account may belong to a client (e.g., an Enterprise entity, a customer) or a division of a client. A client may have one or more accounts. An account may include one or more tasks. A client may have one or more client contacts (e.g., contacts associated with the client). A task development team may have one or more team or group contacts. An account may have one or more account contacts (e.g., client contacts associated with the client and team contacts associated with an entity of task development team). A task may have one or more task contacts (e.g., client contacts associated with the task and team contacts associated with an entity of task development team).

A client or group contact refers to a person or persons who are associated with all accounts of a client or user group. An account contact refers to a person or persons who are associated with all tasks associated with a particular account. A task contact refers to a person or persons who are associated with a particular task. The contact information concerning a client, an account, and/or a task may be stored in the task database system 105 and searchable and retrievable by specifying appropriate attributes. Similarly, on the task development side, there may be team contacts (e.g., source contacts) at the client level, account level, and task level corresponding to the client contacts at those levels.

According to another embodiment, if there is no account contact associated with the account of the task, dependent upon email identification rules 220, activity manager 120 may determine the domain name based on a Web address of a Web site associated with the account. The Web address may also be obtained from the task database system 105 as a part of account contact information of the account associated with the task.

According to one embodiment, if there is no Web address obtained from the task database system 105, activity manager 120 determines the domain name from a domain name registry, such as domain name registry 107, based on an account name of the account. Typically, if the account has been registered in the domain name registry (e.g., WHOIS™), the registered domain name is typically registered under a particular name. Based on the account name, a registered domain name may be obtained from domain name registry 107.

If there is no registered domain name based on the account name, activity manager 120 utilizes a name-to-domain (name/domain) mapping table 225 to obtain the domain name based on the account name. In one embodiment, name/domain mapping table 225 includes a number of mapping entries, where each mapping entry maps a particular name to a domain name. Name/domain mapping table 225 may be maintained and updated over time to map a name to a domain name, especially when a name is not related to a domain name from its appearance. Name/domain mapping table 225 may be maintained by an organization associated with the project development team or by a third party.

The above process is to determine a domain name associated with a client (e.g., customer), an account, and/or a task. The domain name is then utilized to determine email addresses for the purpose of identifying activities of a task. Some of the above operations or the sequential order of the operations may be different dependent upon the specific situations, which may be specified as part of the email identification rules associated with the client, the account, and the task.

According to another embodiment, in addition to obtaining the first set of email address as target email addresses, activity manager 120 determines a second list of one or more contacts associated with the task via task manager 110 from the task database system 105. The second list of contacts, referred to herein as source contacts, is associated with one or more team members of a task development team that are working with the target contacts on the task. A source contact can be an owner of the task, a solution engineer, a customer representative, and/or an account representative. A second set of email addresses associated with the contacts of the second list is determined by activity manager 120, where the email addresses of the second list are referred to as source email addresses. The email server, such as activity server 106, is queried based on the source email addresses and the target email addresses to obtain a list emails and/or calendar events.

In one embodiment, only the emails or meetings that have been exchanged between the source email addresses and the target email addresses (e.g., senders and recipients) associated with the same task are identified. In some situations, a source contact may be handling multiple tasks of different accounts and/or different clients (e.g., different target user groups). Similarly, a target contact may handle multiple tasks of an account or multiple accounts. By matching the exact source email addresses and target email addresses, the truly relevant emails between the source contact(s) and target contact(s) of the same task may be identified.

The determined emails and calendar events can be utilized as part of activities associated with a task or tasks performed by source user groups with respect to a target user group for the purpose of determining a behavioral pattern of the target user group. In one embodiment, a set of features is extracted from the activity data for a predetermined past time period and utilized as a set of training data to train an AI model. The AI model can then be utilized to infer current or future behavioral patterns of a particular target user group.

Figure 4A:
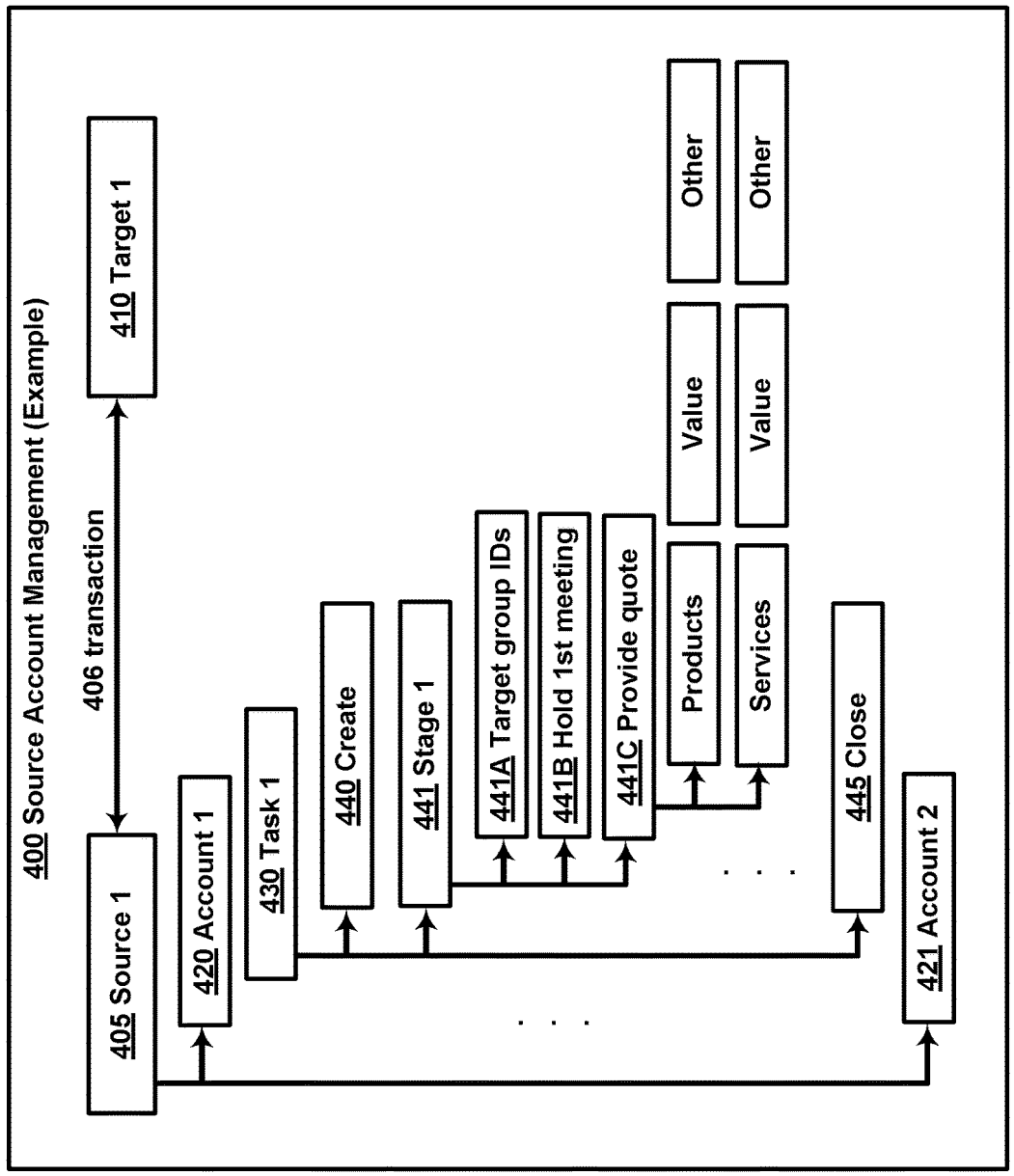
FIGS. 4A and 4B illustrate examples of source account management information that can be used to infer a target's sequence of events according to one embodiment.
Figure 4B:
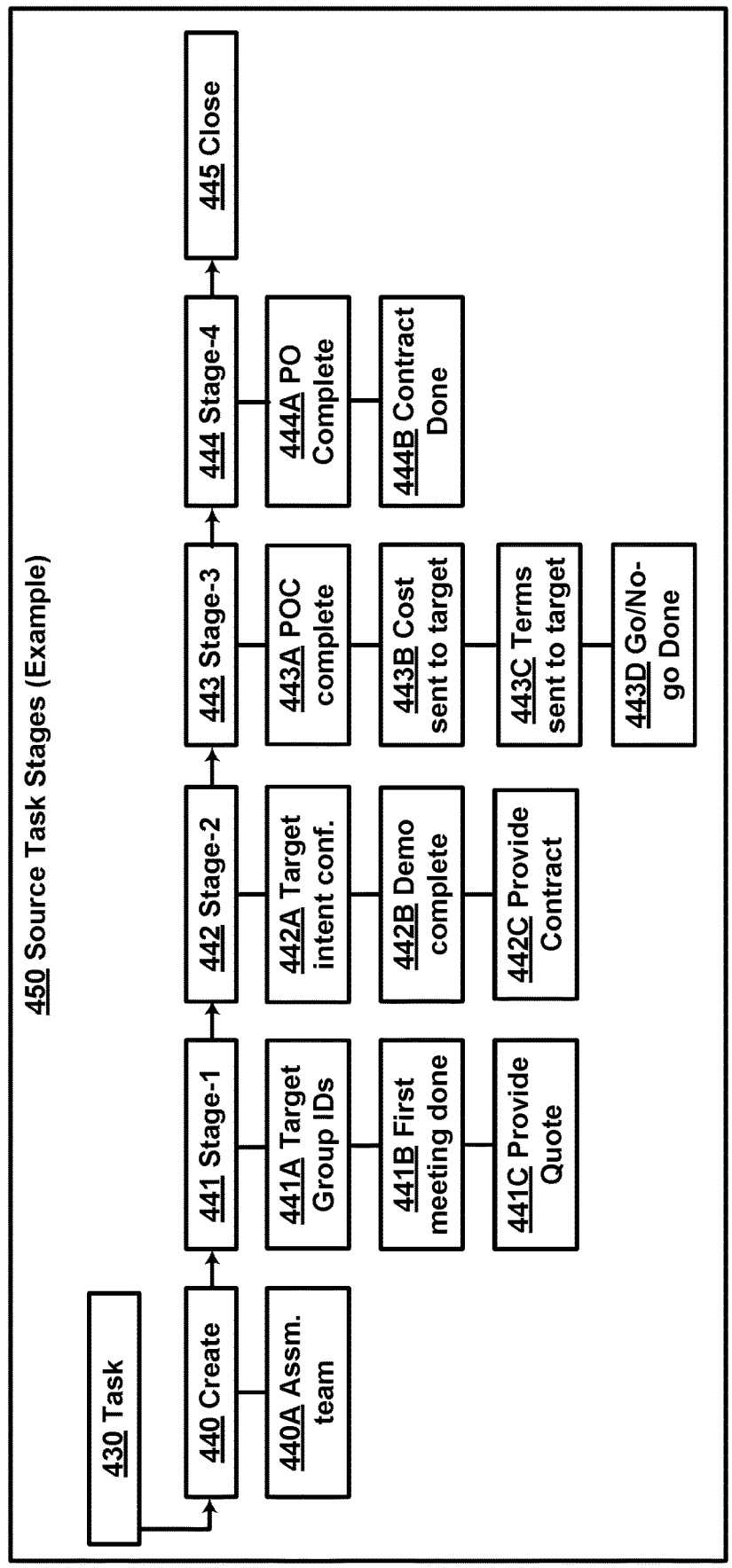

FIGS. 4A and 4B illustrate examples of source account management information that can be used to infer a target's sequence of events (SOE) for performing a task according to one embodiment. As described above, a task can be analogous to a transaction 406 such as a negotiation process of a contract or deal for providing services or products between a source user group representing a source entity (e.g., a service or product provider or vendor) and a target user group representing a target entity (e.g., a service or product acquirer).

A source user group's process for a transaction or task 406 includes a number of stages, typically beginning with a create stage 440. The source user group's stages will likely differ from other source user groups' stages for transaction stages. The target user group's process for the transaction or task includes a sequence of events (SOE) that typically do not map directly to the source user group's stages for proceeding through the transaction 406. While an experienced source user group 405 may be vaguely aware of the SOE of target user groups, generally, source user group 405 typically does not know a particular target user group 410 sequence of events for a transaction. The embodiments disclosed herein are systems and methods for inferring a target user group's SOE from information gathered from source user groups' data and determining other target user group profile information as may be related to the target user group's SOE.

Referring now to FIG. 4A, when a source 405 proposes to engage in a transaction 406 with a target 410, if target 410 does not already exist within task database system 105, then source 405 adds target 410 to the task database system 105. Target database system 105 returns a target ID associated with the target information stored within the task database system 105. If an account 420 associated with source 405 and target 410 does not already exist within the task database system 105, then source 405 adds an account 420 associated with target 410. Task database system 105 returns an account ID to source 405 for use in generating additional information in the task database system 105 for the task 430. A task includes one or more stages, e.g. 440 create task, 441 Stage 1 through 445 Close. The number of stages in the task 430, and the stage items in each stage, can vary for different source user groups.

As an example, task 430 has a stage 440 wherein the task is created. A next stage, e.g. 441 stage 1 may include 441A identifying members of the target user group and adding the identified members of the target user group to the task database system 105. Stage 1 441 may further include holding a first meeting 441B, and providing a quote 441C to the target 410. The quote 441C can include, e.g., line items for products and services for each product or service included in the transaction, quantity, unit cost, delivery commitments, service level agreements, any discounts, or other incentives, and other terms.

As each stage 1 item 441A-441C is completed, the task database system 105 is updated to reflect the completion of each item. As described more fully below, with reference to FIG. 5, updated status information for each stage, e.g. stage 440-445 of task 430, is extracted from the task database system 105 on a periodic basis. The updated status information is processed to generate one or more actual events on the source's stages, and one or more inferred events that may indicate a transition in the target's sequence of events. Processing the updated status information can also include identifying a change in one or more target contacts that the source is interacting with, which can indicate a transition in the target's sequence of events. Source 405 can have one or more accounts 420 and 421 associated with each target 410 having similar elements for accounts, tasks, stages, and line items in the stages.

Referring now to FIG. 4B, a detailed example of a source's task stages 450 is shown with respect to task 430. As a source's team works on a task, the task advances from its creation 440 to its next stage 441. The task owner evaluates the activity on the account, and based on broad guidelines in the source organization, moves the task to its next stage. Such advance is an indicator that the target has advanced their side of the transaction process as well. Some of the prerequisites of stage advancement are described below, with reference to FIG. 4B. Throughout this application, a "source" refers to a source user group or source entity and a "target" refers to a target user group or target entity.

Each stage advancement takes time and resources, which are tracked in the task database system 105 and/or activity database system 106, with updates to the task. Stage advancement is tied very closely to the target's timelines and the target's resources involved in the transaction. Thus, activities on the source's side that indicate a probability of stage advancement are also an indicator of a probability that the transaction will be completed from the target's side. As described below, the target's personnel typically change with each transition of a target's stage. Thus, a change in personnel with which the source is engaging in the transaction is an indicator that there has been an advancement in the target's stage. The target personnel with which the source is engaging can be determined by extracting and analyzing the source's emails with target personnel during a stage of the source.

As described above, task 430 can include a create stage 440, stages 1-4 (references 441-444), and a close stage 445 closing the task 430. A task does not necessarily transition through all stages to reach the closing stage 445. It is foreseeable that a task may not culminate in completion. Lack of completion may be indicated by an excessively long duration in a particular stage that is detected by processing the periodically extracted task database system 105 history. A target may abandon a task due to economic circumstances, dissatisfaction with the source, or the source's product, lack of seasonality of the task, or other reason as may be indicated in the events generated from the extracted history data.

In a create stage 440, a team or user group is assembled 440A to engage with the target 410 for the task. Estimated resources can be assigned to the team for 440A. An estimated completion date can be assigned in the create stage 440 for completing the initial engagement with the target. In stage 1 (reference 441) the target's team can be identified 441A, a demonstration of a product or service can be performed 441B during a first meeting with the target 441B, culminating in the source team providing a quotation 441C for products and/or services to the target 410. The target's team in stage 1 may include a department head and a department operations individual. Completion of one or more of these items 441A-441C indicates progress on stage 1. Completion of all items in stage 1 indicates a high probability that the stage will transition to stage 2 (reference 442). The high probability of a stage transition to stage 2 for the source also indicates a good probability that the target sequence of events will transition to a next stage.

In stage 2 (reference 442), target 410 intent to proceed with the transaction 442A may be confirmed, such as verbally or in writing. A demonstration of the product or service 442B can be performed, and source 405 may provide target 410 with a contract for target's contract review. Target personnel in stage 2 may include a sponsor for the product and a target, typically the department head. Completion of 442A-442C indicates a high probability that source 405 will transition to stage 3. Completion of 442A-442C also can indicate a good probability that target's sequence of events will also transition to a next event.

In source's stage 3 (reference 443), source may demonstrate proof of concept (POC) 443A for a deliverable for the task 420. Final pricing 443B may be sent to the target 410. Terms and conditions of the transaction 443C may also be transmitted to the target 410 for the target's 410 review and approval. Target 410 may give an affirmative "go/no-go" indication to source 405 in stage 3. Target personnel in stage 3 may include operations staff, a sponsor to evaluate the product or service, and an information technology (IT) department representative to evaluate feasibility and security of the product or service. Completion of items 443A-443C indicates a high probability of stage advancement to stage 4. A favorable completion of item 443D, "go/no go" decision indicates high probability that the stage will advance to stage 4. An unfavorable decision in 443D "go/no go" may be a strong signal that task will go abandoned.

In stage 4 (reference 444), completion of stage items for purchase order complete 444A and/or contract done 444B can be a strong indication that the task will transition to close 445. Delay in this stage can indicate lack of performance on the part of the source 405, or other obstacle to completion. Target personnel involved during source's stage 4 may include a purchasing officer, legal officer, and contracts review officer. In stage 445, the task is closed.

Figure 5:
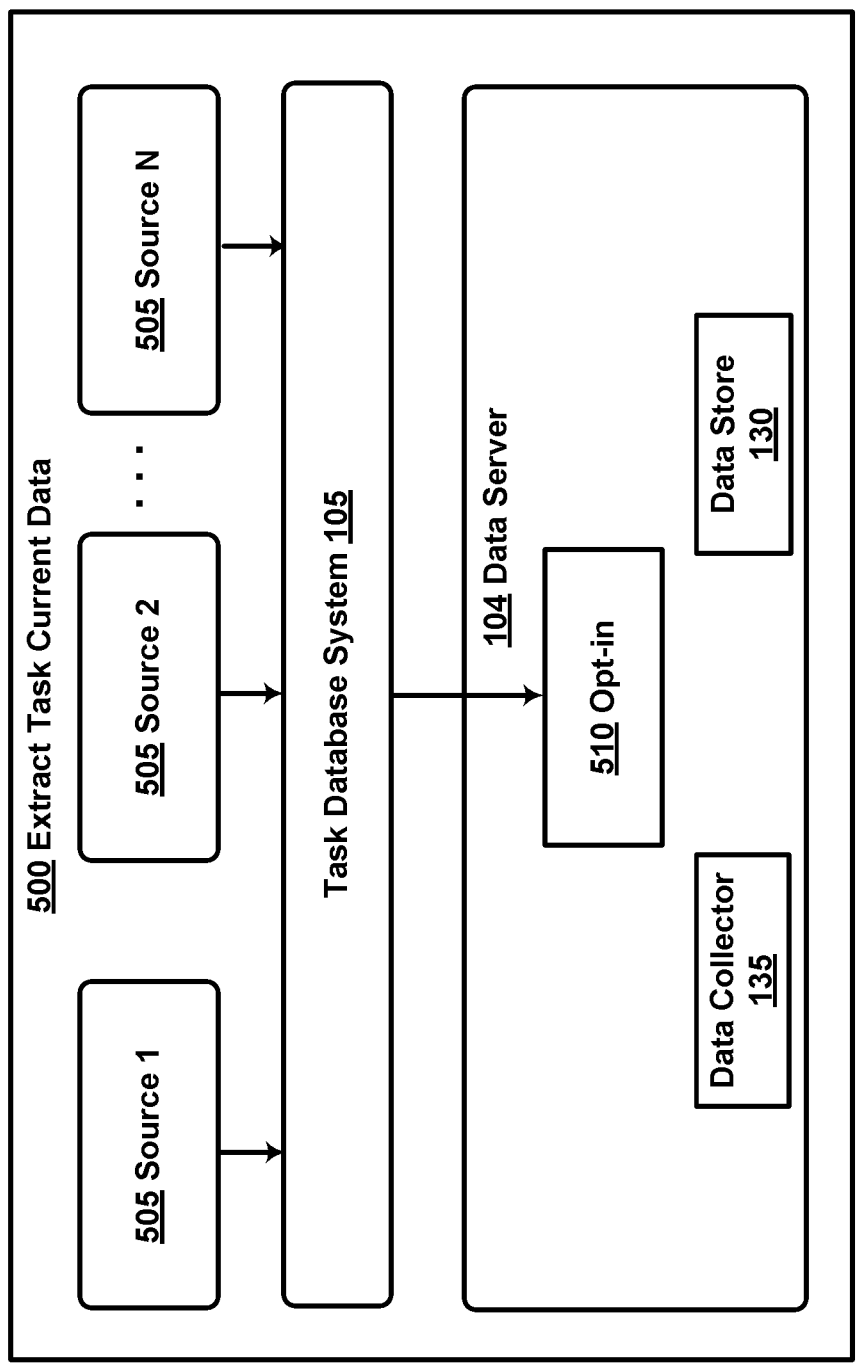
FIG. 5 illustrates a process for extracting source event history data that can be used to train an artificial intelligence (AI) model that predicts a target's sequence of events according to one embodiment.

FIG. 5 illustrates a process 500 for extracting source's task database system 105 data to generate event history data that can be used to train an artificial intelligence (AI) model that predicts a target's sequence of event (SOE) for the target's process according to one embodiment. Process 500 may be performed by process logic that includes software, hardware, or a combination thereof. For example, process 500 may be performed by the data collector 135 of data server 104B as in FIG. 1B. The event history represents changes to tasks in the task data through an event history maintained in the data hub, e.g. server 104. An extractor component of the data hub retrieves the stages of the task at a periodic interval, such as every 15 minutes. The incremental updates to all tasks in the interval, along with a date and time stamp of the update, are recorded. The event history establishes the processing cycle timeline and, when taken in aggregate across several tasks, provides a large training set for training the artificial intelligence (AI) model that may predict the target's stages (sequence of events) and other target profile data, such as the personnel involved in each stage.

In FIG. 5, a plurality of sources 505 (source 1, source 2, through source N) use the task database system 105 described above with reference to FIGS. 1A and 1B. Data server 104 or 104B can extract task data from task database system 105 on a periodic basis. Task data includes information about one or more sources, accounts of the sources, tasks of the sources, and stage information for the tasks of the sources 505. Sources 505 can opt-in to having their task data extracted, processed, and used to train the AI model that predicts a sequence of events for a target using the extracted data. In an embodiment, any source 505 can elect to opt-in, and additionally opt-out for a specific target or for a specific task. Source opt-in data can be de-identified with respect to the source, before or during extraction from the task data. Each source in the plurality of sources cannot access information extracted from the task database that was received from another source in the plurality of sources. A target group does not share its sequence of events with any of the plurality of sources.

Figure 6:
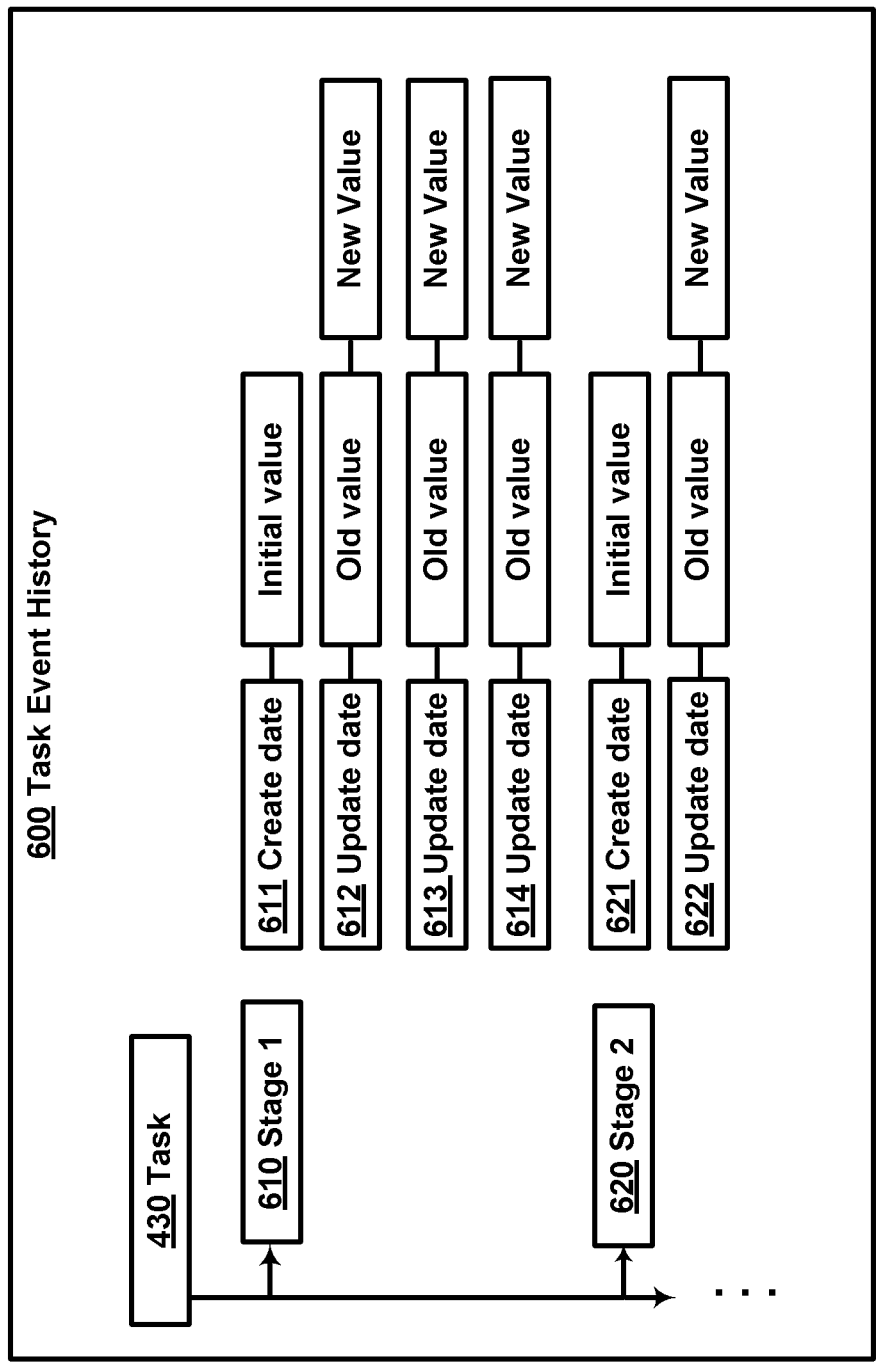
FIG. 6 illustrates an example form of source event history data that can be used to train a model that predicts a target's sequence of events according to one embodiment.

FIG. 6 illustrates an example 600 of source event history data that can be used to train a model that predicts a target's sequence of events in tasks according to one embodiment. As described above with reference to FIGS. 1A, 1B, and 2, task database system 105 data can be extracted periodically and be processed to generate event history data for a plurality of sources each having a plurality of tasks with a plurality of stages. Periodic extraction can be performed, e.g., every 15 minutes. When a task 430 is newly created, an item in a stage, e.g. stage 1 (reference 610), can have a create date 611 and an initial value. For example, when task 430 is created, stage 1 (610) may have a line for assembling team 440A, as described with reference to FIG. 4B. There may be one or more line items, each line item listing a team member, an amount of time that the team member is allocated for performing a specified function, a due date for the function to be completed, and a percentage complete of the team member's specified function.

Each of these fields of data can have a create date and an initial value. Each time task data is extracted, an update date, e.g. 612, can be established with a date and time stamp of the extraction of the task data, a previous (old) value for the field of the line item and a new (current) value of the field for the line item. In this example, a progress percentage (new value) for completion of the line item can be compared against the amount of time expended by the team member (time expended÷initial allocated value) and the amount of time elapsed since the stage started (update date—create date) can be used to determined likelihood that the stage will transition soon.

In an embodiment, data extraction for task 430 may be one final time, at the time that the task closes, then not performed again. After the task 430 closes, there should be no new task information to update. In an embodiment, data extraction for a stage that has been completed, and the account manager has transitioned the task to its next stage, can be performed once, and then not performed again. After the stage closes, there should be no new information in the stage to update. In an embodiment, event history data may be aged out over a 2-year period.

Figure 7:
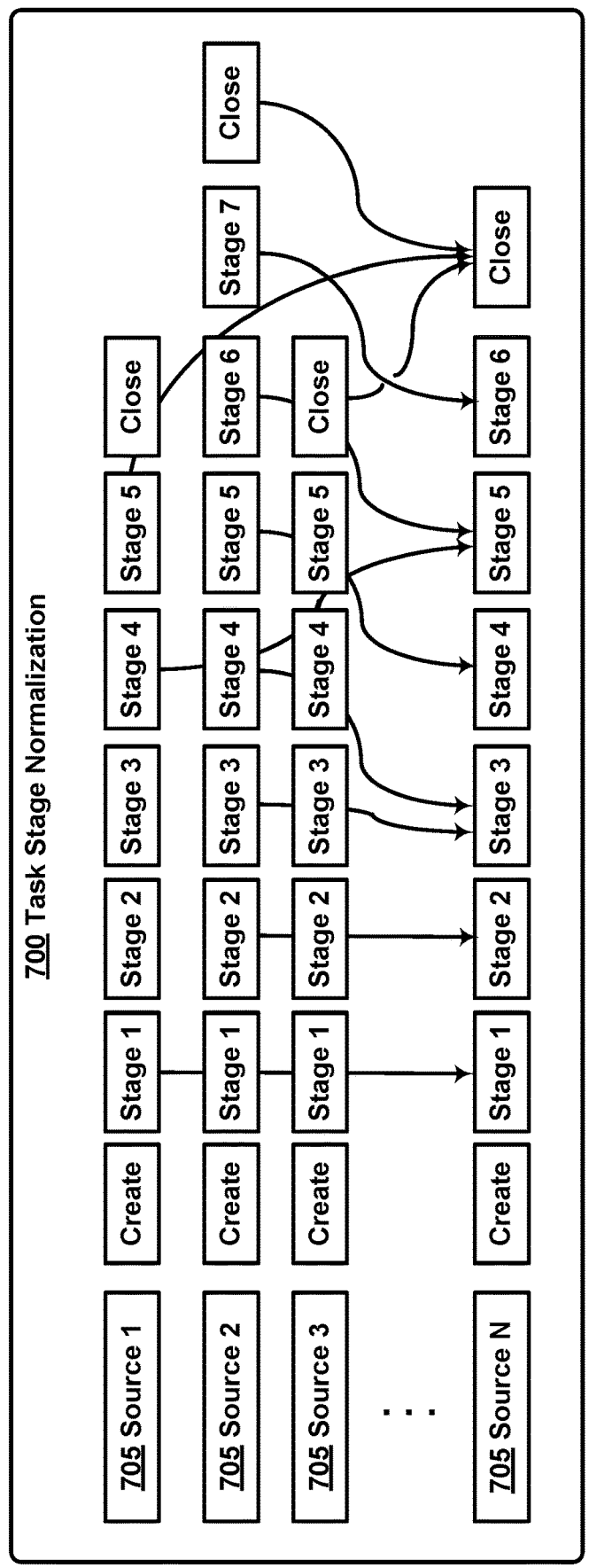
FIG. 7 is a block diagram illustrating a stage normalization process to prepare source event history data for use in training an AI model that can predict a target's sequence of events according to one embodiment.

FIG. 7 is a block diagram 700 illustrating a stage normalization process to prepare source event history data for use in training an AI model that can predict a target's sequence of events (SOE), and other target profile data, according to one embodiment. Stage normalization determines a set of normalized stages, distinct from the source's actual stages, using stage transition events obtained from processing the extracted task data to generate the event history of the task database system 105. A method for determining, and using, the set of normalized stages is described in detail with reference to FIG. 8, below.

While the set of stages to perform the source's side of a transaction is generally understood and known, each source in a plurality of sources is likely to have their own set of stages with different line items and values than other sources. Similarly, each target can have their own sequence of events (SOE) for managing a transaction, and the target's SOE will likely be different than any source's set of stages for managing the transaction. Further, a target's specific SOE may not be known to a source at the time of the transaction. Rather than having the source engage in a lengthy discovery discussion with a target, Applicant's claimed embodiments use source event history information to train an artificial intelligent (AI) model to predict a target's SOE, and other target profile data. At a minimum, the predicted SOE gives the source some insight into how to efficiently engage with the target, before the task begins.

As shown in FIG. 7, source N (reference 705) stages represent the normalized set of stages for all sources 1, 2, 3, . . . . To determine the set of normalized stages for all sources, a greatest number of stages in a source's process is determined for each source. An average is taken from the greatest number of stages for each source. This average value sets the number of stages in the set of normalized stages. For each source's stages, one or more stage transition events are determined for each stage of each source's process.

Using the stage transition events of all sources, a new set of stage advancement criteria can be determined for each stage of the set of normalized stages. As shown in FIG. 7, some, or all, of the stages in each source's set of stages are mapped to a corresponding stage in the normalized set of stages, using comparisons of the source's transition events to the new set of stage advancement criteria. The source's extracted stages and stage transition events, mapped to the set of normalized stages and new set of stage advancement criteria, are used to train the AI model that derives the target's sequence of events and target profile.

For example, source 1 stage 1 is mapped to normalized stage 1. Source 1 stage 4 is mapped to normalized stage 5. Source 1 stage 5 is mapped to normalized stage "close." Similarly, source 2 stage 1 is mapped to normalized stage 2. Source 2 stage 3 is mapped to normalized stage 3. Source 2 stage 4 is also mapped to normalized stage 3. Source 2 stage 5 is mapped to normalized stage 4. Source 2 stage 6 is mapped to normalized "closed" stage. Source 2 stage 7 is mapped to normalized 6. Also, source 3 stage 1 is mapped to normalized stage 1. Source 3 stage 2 is mapped to normalized stage 2. Source 3 stage 3 is mapped to normalized stage 3. Source 3 stage 5 is mapped to normalized stage 4, and source 3 stage "closed" is mapped to normalized stage "closed."

Figure 8:
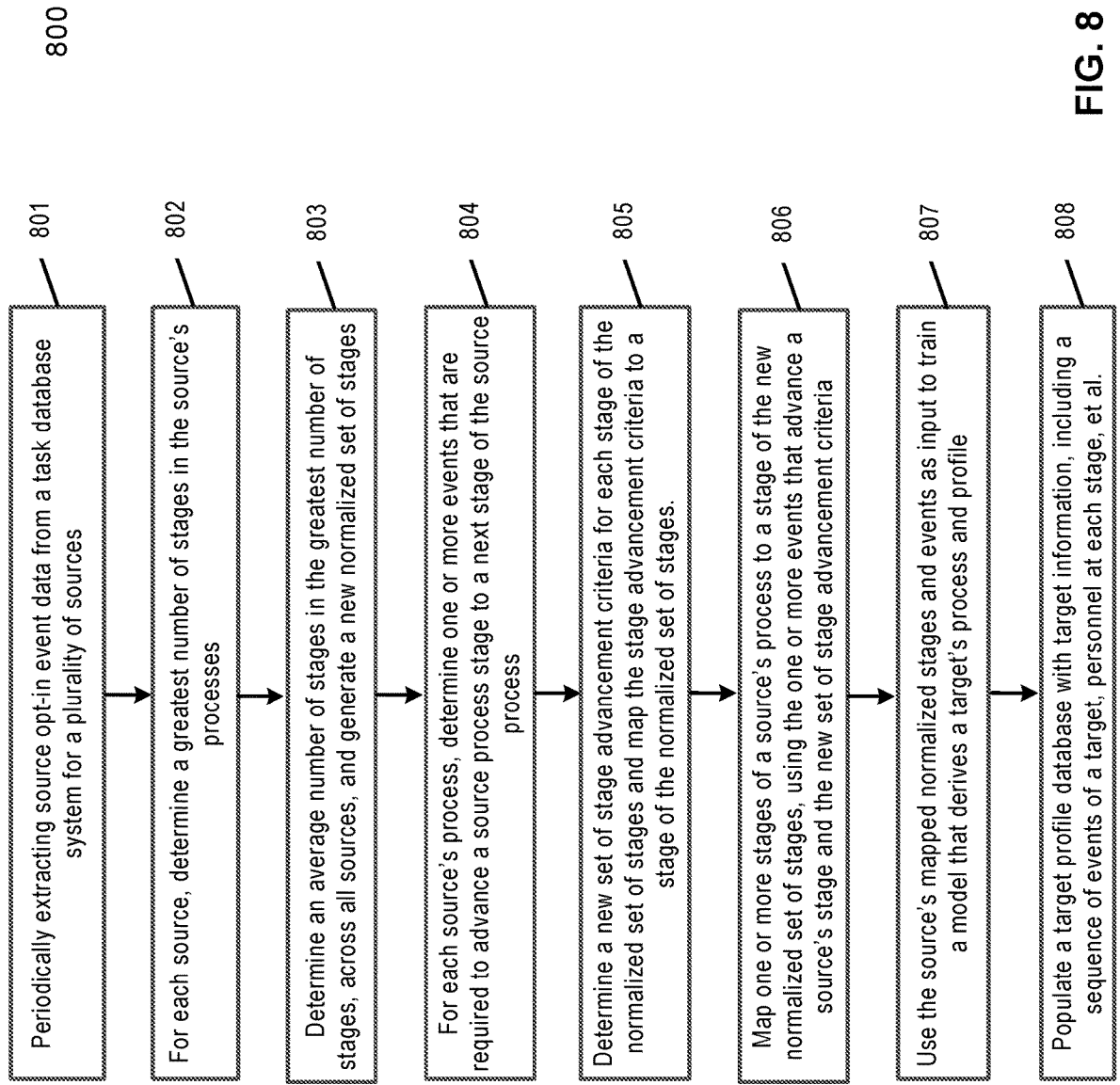
FIG. 8 illustrates a method for obtaining and preparing source event history data for use in training a model that can predict a target's sequence of events according to one embodiment.

FIG. 8 illustrates a method 800 for obtaining and preparing source event history data for use in training an AI model that can predict a target's sequence of events (SOE) and generate the target's predicted profile according to one embodiment. In operation 801, a data hub, e.g. server 104, can periodically extract task database system 105 data from a plurality of sources who have opted-in to have their task data used train an artificial intelligence (AI) model that can predict a target's sequence of events (SOE) in a transaction, and other target profile information. For each source, a user of that source cannot access data of another source in the plurality of sources. The target does not share its own sequence of events or other target profile information.

In operation 802, for each source, the greatest number of stages in a task in the source's task data is determined. In operation 803, an average number of stages is determined by averaging the greatest number of stages for each source in operation 802. A new normalized set of stages is generated, having the average number of stages. In operation 804, for each source's task process, one or more events are determined for each stage in the source's task process that are required to advance the process to a next stage in the source task process.

In operation 805, a new set of stage advancement criteria is determined for each stage in the set of normalized stages. Stage advancement criteria from the new set of stage advancement criteria are mapped to each stage of the set of normalized stages. In operation 806, for each source, one or more stages of the source process are mapped to a stage of the new set of normalized stages using one or more events that advance a source's stage to a next stage, and the new set of stage advancement criteria. In an embodiment, one or more stages of the source's process may have no equivalent in the new set of normalized stages, and will not be mapped to a stage in the new set of normalized stages.

In operation 807, the source's stages and source's stage transition event(s), mapped to the set of normalized stages, are used as input to train an AI model that infers a target's sequence of events and generates a predicted target profile information, including predicted contacts at each event in the target's sequence of events in a transaction. The AI model can be trained as a Hidden Markov Model, an Echo State Network, or a Bayesian Network, or other model type. In a Hidden Markov Model, the system being modeled (target sequence of events), X, has unobservable hidden states. Another process, the source's process, Y, depends upon X. To learn the target's process, which is hidden, we observe the source's processes which are dependent upon the target's processes.

In operation 808, a target profile 224 is inferred from the AI model and is stored in the target profile prediction model 222. Additional target information, such as a list of target contacts in each event in the target's sequence of events, can also be inferred and stored in target profiles 224.

Figure 9:
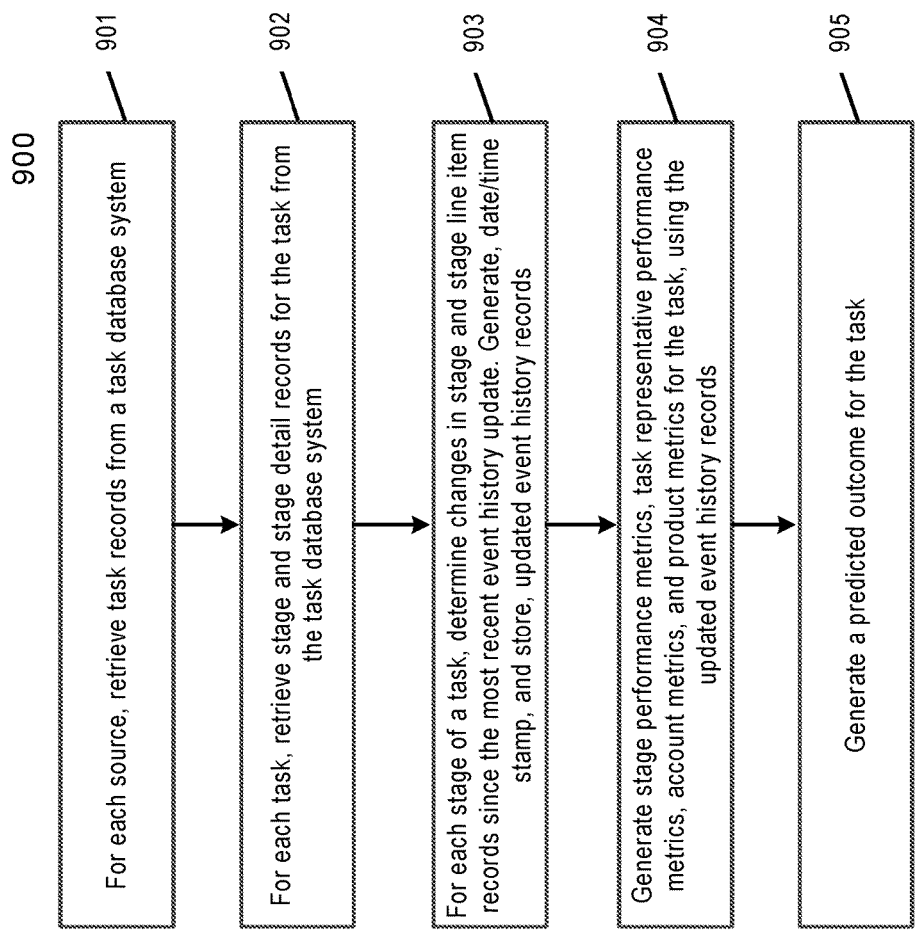
FIG. 9 illustrates a method of generating an updated event history and performance metrics for a source user group using the updated event history according to one embodiment.

FIG. 9 illustrates a method 900 of generating an updated event history and performance metrics for a source using the updated event history according to one embodiment. In operation 901, for each source in a task database system, e.g. task database system 105, which has opted-in to sharing the source's task data, task records are retrieved from the task database system for the source. In operation 902, for each task of the source, retrieve stage data and stage line item data for the task from the task database system.

In operation 903, for each stage of the task of the source, determine changes in stage information and stage line item data since the most recent event history update. Generate, date and time stamp, and store the updated event history records. As described above, with reference to FIG. 6, changes since a most recent update to stage information and stage line item data can be determined by comparing current retrieved stage data with previously retrieved stage data to establish the changes in stage data. Meaning of the changes is determined in operation 904.

In operation 904, stage perform performance metrics, source representative performance metrics, account metrics, and product metrics for the task can be determined using the updated event history records. Performance metrics are described in detail below, after operation 905. In operation 905, the AI model, which has been trained using event history data, can generate a predicted outcome for the task. Predicted outcomes include won, lost, and stalled/dead.

Stage Metrics: Stage metrics can be determined from the progression of the task from one stage to the next. Stage metrics include stage duration, stage updates, and stage transition probabilities. Stage duration can be determined, for any stage of a source's task, from the date and time of transitioning to the stage and the most recent event history data and time stamp. The stage duration is the difference between these two values. In an embodiment, once a stage is closed, the "most recent" event history update is the event history update immediately following the closing of the stage, at which time the stage duration becomes static for any particular stage. Stage transition probabilities can be predicted from event history data, using the trained AI model, selecting tasks of a particular source having open (not yet closed) stages, determining the stage criteria for each stage, and generating a prediction probability with the AI model as to whether the particular source stage will transition to a next stage (i.e., the stage will close). A similar inference can be used to determine a probability that the task, in view of the current status (open/closed) of its stages, will close.

Trends in duration and statistical anomalies in duration: Statistical anomalies to a trend in the duration of stage transitions can include outliers to a trend in duration and seasonality of the duration. Using the AI model, a trend in the duration of normalized stages can be determined across any set or subset of event history records desired. For example, a particular source's task and stage records can be selected from event history, and a trend in the duration of each stage of the source's process can be established.

Outliers deviate from the trend and can be quantified. Certain tasks may be subject to seasonality of transactions. Seasonality of data is the presence of variations that occur at specific regular intervals less than a year, such as weekly, monthly, or quarterly. Seasonality may be caused by various factors, such as weather, vacation, or holidays, and consists of periodic, repetitive, and generally regular and predictable patterns in time-series data. Deviations from a trend in duration of stages can be detected by the AI model and analyzed by the AI model to determine whether the deviation from the trend is due to seasonality of the stage transition data.

Source Representative Metrics: Stage duration trends for one or more tasks, such as for a particular source representative, can be determined by selecting event history records for tasks in which the source representative is the owner of the task. Each task can have an estimated duration from creation to close. Stage duration trends for the source representative can be determined by computing a statistic for, and/or graphing, the differences between the estimated duration to close the task and the actual final close duration in the event history records. The actual final close duration for a task is the difference between the task creation data and the task closing date.

Similarly, a closure rate for a source representative can be determined by selecting task event history records for the source representative and computing the closure rate as:

$$\% \text{ closed} = \left(\frac{\# \text{ closed}}{\text{total tasks}}\right) * 100.$$

Account Metrics can include an account value, prior task completion rates, and potential value available from the account within a territory. Using the completion rate above, limited to a particular account, and an estimate of potential transactions to the account (target) in the territory, account value can be estimated as: account value=total territory value*% closure.

Classes of Outcomes can include won, lost, and stalled/dead. Won, is a successful outcome. Lost is an unsuccessful outcome. Stalled/Dead is a task that is stuck on a stage, with no outcome. Won and lost are mutually exclusive discrete outcomes that are readily determined by a status at a stage of the source's process. If the event history indicates that the task completed all of its stages, and transitioned to a "close" stage, then the task is won. If a task status was changed to "lost" by the owner of the task, then the task was lost. Determining a stalled/dead outcome may be expressed as a probability of closing the stage or a probability of completing the task, unless and until the task either transitions to a next stage or the task is expressly closed. A probability of a stalled/dead task can increase based upon one or more of: a duration that a stage of the task has remained open is substantially longer than an estimated time for transitioning the stage, fewer than expected communications are associated with the stage, or fewer than expected resources are being expected to move the stage forward.

FIG. 10A is a block diagram 1000 illustrating features of a target profile that can be predicted using the AI model that is trained using source-side task data that is processed to generate event history that is used to train the AI model.

A target's sequence of events (SOE) is typically different from a source's stages during a transaction. However, the events in a source's stage that lead to a source stage transition can be a strong signal that a target has transitioned to a next event in the target's sequence of events. To distinguish source's stage transition events from target's sequence of events, FIGS. 10A and 10B will be described in terms of a target's stages.

A target profile 1000 can have feature categories 1010, value metrics 1020, and a description 1030 for each of the feature categories 1010. Feature categories 1010 include target stage metrics 1011, target purchasing group 1012, target process metrics 1013, and target product groups 1014. Target stage metrics 1011 include value metrics for target process stages (a list of stages), a duration of each stage of the target, and a probability of a stage transition. Target stages are predicted by the AI model that has been trained using source's task data, stage data, stage line items, and event history. Given a particular task, stage, and event history for the stage, the AI model can predict a transition probability for the target stage. Given a particular task, stage, and event history, the AI model can predict a duration of a stage of the target. The AI model can also produce a predicted list of the target's stages. The predicted target stages, target stage durations, and target transition probabilities can be stored in the predicted target profile 1000.

A target purchasing group 1012 can be inferred by the AI model. In each of the source's stages, there will be communications between the target and source. Extracting of the task data can include extracting email addresses from communications that occur between target and source during a source's stage of a task. A target purchasing group for a target stage may be inferred by the AI model processing the email communications of the target and any number of sources at each normalized stage of the sources.

Evaluation criteria for target process metrics 1013 can be inferred by the AI model based upon deliverables at each stage in the source's set of normalized stages for a target. The deliverables requested by a target at each stage of the target's process, and the criteria for the deliverables, tend to be relatively constant. For example, a target may require proof of concept at target stage 2, require a security review at target stage 3, and require functional testing at target stage 5, prior to acceptance of the product or service. The deliverable and the timing of the deliverable can be inferred using the AI model as trained by source-side task data, stage data, and event history.

Target Product Groups 1014 can include metrics for product mix, unit capacity and expansion/growth. Product mix can be determined by querying the task data for a source. Unit capacity can be determined from a product life cycle estimate for a particular product in view of an estimated growth rate for the produce and the for the target, based upon source task data.

All of the above target profile metrics can be derived from the source-side task data, stage data, including line items and stage transition events, and event history generated from task data periodically extracted from the task database system.

Figure 10B:
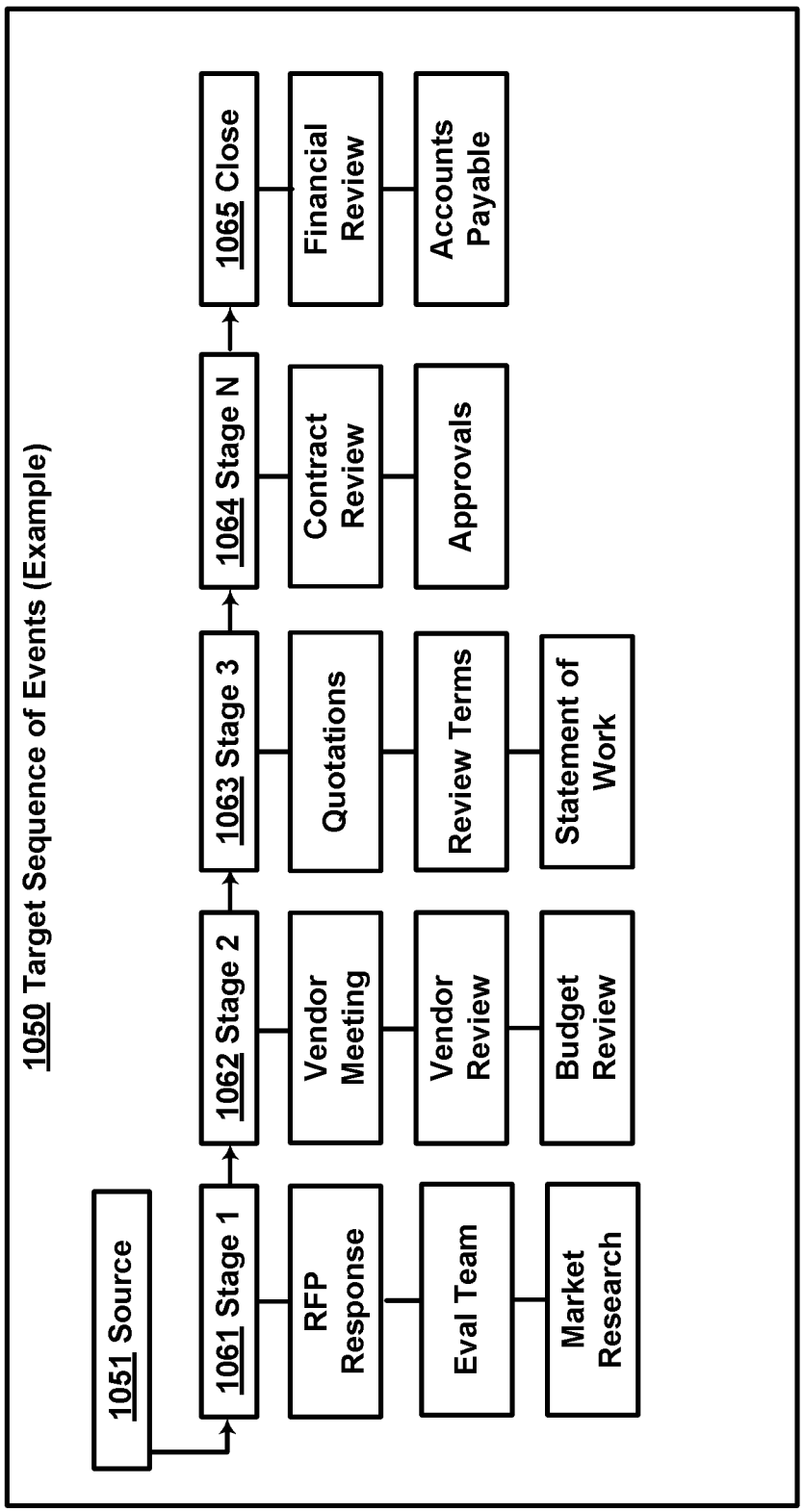
FIG. 10B illustrates an example target sequence of events (SOE) that may be inferred by the trained AI model from the source event history data according to one embodiment.

FIG. 10B illustrates an example target sequence of events (SOE) 1050 that may be inferred by the trained AI model from the source's event history data, according to one embodiment. In the following description of FIG. 10B, each event in the target's SOE will be referred to as a "stage."

A target's sequence of events for engaging with a vendor 1051 can include a plurality of stages, e.g. stage 1 . . . N and a final stage, 1065 Close. In stage 1 (reference 1061), a target may issue a request for proposal (RFP) for a product or service, and assemble an evaluation team and a market research team to select candidate products and services by different vendors. In stage 2 (reference 1062), target can hold a meeting with vendor 1051 to discuss the vendor's product. The target's request to hold a meeting with a source, and the change in personnel on the target's side, can be detected by source-side event history as an indication that the target's stage has transitioned from stage 1 to stage 2. In stage 2, a review of the vendor may be held and a budget review may be held to determine whether the product estimated costs are within the target's budget. A target's request for a quotation from vendor (e.g., source) 1051, and the change in personnel as between target stage 2 and stage 3, can be detected in the source event history as two indications that target's stage has transitioned from stage 2 to stage 3. In stage 3 (reference 1063), target can receive a quotation for products and or services from vendor 1051 that can include terms and conditions, and a statement of work. In stage N (reference 164), target can perform a contract review and obtain approvals to proceed with the acquisition from vendor 1051. The target's sequence of events can close (reference 1065) with a financial review of the target's experience for this transaction, and accounts payable completing payment to vendor 1051. Receipt of payment from target can be detected in the source event history as an indication that target's process has transitioned to "close."

The embodiments disclose systems and methods for training artificial intelligence (AI) model using data extracted from user groups who have opted-in to providing their event history of interactions with one or more other user groups when performing tasks or actions between different user groups. The data of the tasks associated with the user groups can be stored in a task database system. Each user group can have a different processing pipeline termed "stages" when performing a task. Each user group can have its own processes, termed a "sequence of events," for performing a task. This disclosure assumes that each user group's sequence of events is (1) distinct from other user groups' stages, and (2) that each user group's sequence of events is generally not known to other user groups. Thus, a principal feature of this disclosure is training an AI model to generate inferences as to a particular user (referred to as a target user group) group's sequence of events in a task transaction using event history of one or more other user groups (referred to as source user groups) that have each, separately, had interactions with that particular user group.

A target user group's sequence of events can include such items as holding an initial meeting to hear a proposal from a source user group providing a product or service that the target user group wishes to acquire, a demonstration of the product or service, a quotation of cost and terms of transaction that includes line items for each product or service included in the transaction, quantity, unit cost, delivery commitments, service level agreements, any discounts, or other incentives, and other terms. A next event can include the source demonstrating a proof of concept for the target, then delivery of the final product, acceptance of the final product, approval of payment, and other items. The target user group's sequence of events differs from target user group to target user group, and a particular target user group's sequence of events is not generally known source user groups prior to a task having been completed with the particular source user group. Thus, prior to a first transaction, a source user group has little, or no, insight into a particular target user group's sequence of events.

Applicant's claimed embodiments infer the target user group's sequence of events by collecting and processing of source-side event data of a number of source user groups. The source-side event data is used to train an AI model that predicts or infers a particular target user group's sequence of events. The source user group can leverage the knowledge of the target user group's sequence of events to tailor the source user group's engagement with the particular target to that target user group's process.

The techniques described this application can be applied to many scenarios to profile (e.g., determining behavioral patterns) a target party or entity based on the activity data from other source parties or entities that interact with the target party without having to access the data of the target party or to contact the target party. In one embodiment, a user group may represent a party, an entity, an Enterprise organization, and/or a business unit or division of an entity. A task may represent a project, an opportunity, or a contract/deal negotiation process between two parties. A source or a source user group may represent an entity that provides or attempts to provide a service or a product to another entity (e.g., a seller). A target or a target user group may represent an entity that acquires or attempts to acquire a service or product from another entity (e.g., buyer). A task database system may be a customer relationship management (CRM) system. An activity database system may be an email/calendar system. Other configurations may also be applicable.

Figure 11:
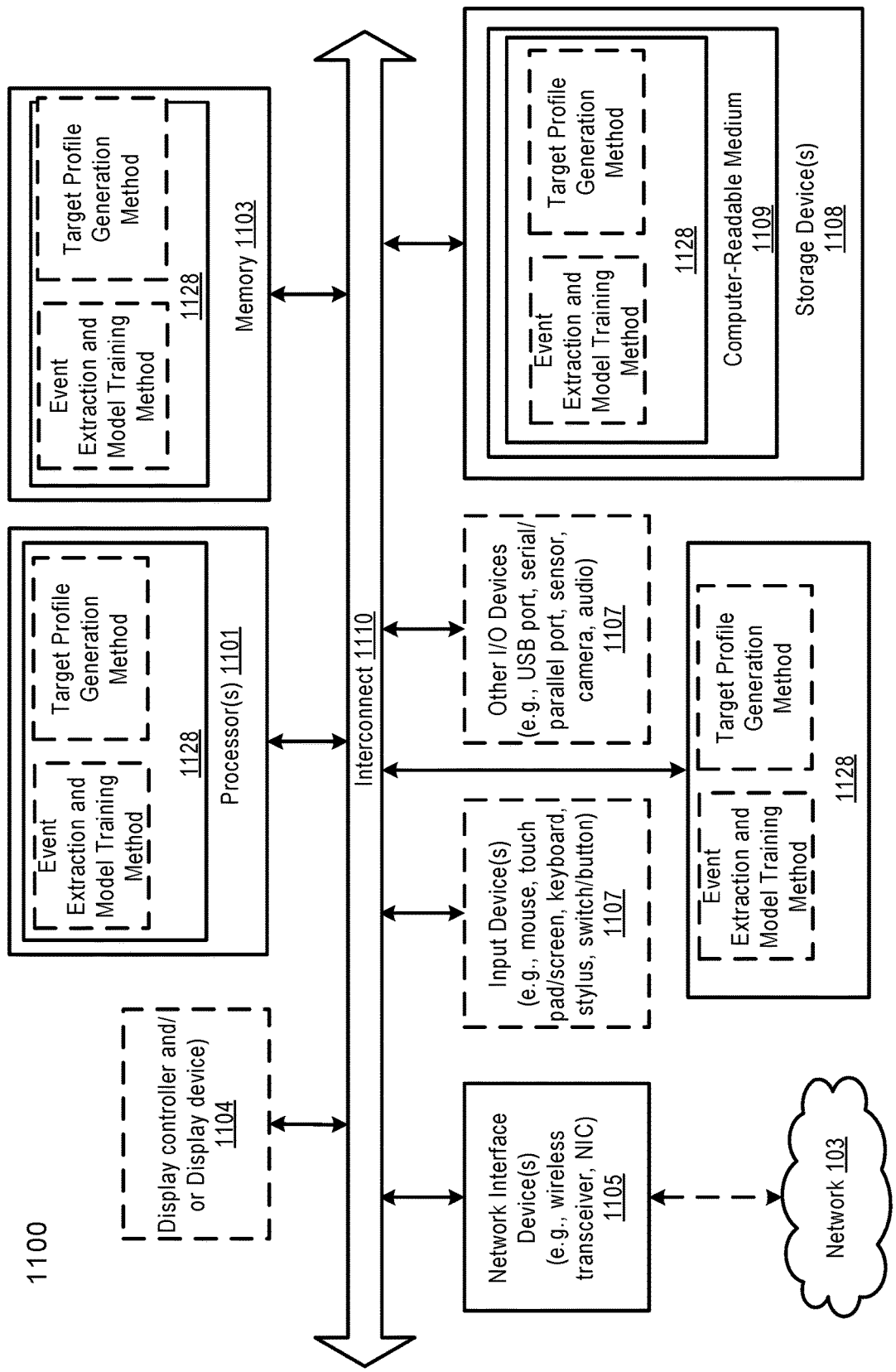
FIG. 11 is a block diagram illustrating an example of a data processing system which may be used with any embodiment of the invention.

FIG. 11 is a block diagram illustrating an example of a data processing system which may be used with any embodiment of the invention. For example, system 1100 may represent any of data processing systems described above, such as data analytics system 104, task database system 105, or activity database system 106, etc., performing any of the processes or methods described above. System 1100 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

System 1100 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

For one embodiment, system 1100 includes processor 1101, memory 1103, and devices 1105-1108 via a bus or an interconnect 1110. Processor 1101 may represent a single processor or multiple processors with a single processor core or multiple processor cores included therein. Processor 1101 may represent one or more general-purpose processors such as a microprocessor, a central processing unit (CPU), or the like. More particularly, processor 1101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1101 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1101, which may be a low power multi-core processor socket such as an ultra-low voltage processor, may act as a main processing unit and central hub for communication with the various components of the system. Such processor can be implemented as a system on chip (SoC). Processor 1101 is configured to execute instructions for performing the operations and steps discussed herein. System 1100 may further include a graphics interface that communicates with optional graphics subsystem 1104, which may include a display controller, a graphics processor, and/or a display device.

Processor 1101 may communicate with memory 1103, which in one embodiment can be implemented via multiple memory devices to provide for a given amount of system memory. Memory 1103 may include one or more volatile storage (or memory) devices such as random access memory (RAM), dynamic RAM (DRAM), synchronous DRAM (SDRAM), static RAM (SRAM), or other types of storage devices. Memory 1103 may store information including sequences of instructions that are executed by processor 1101, or any other device. For example, executable code and/or data of a variety of operating systems, device drivers, firmware (e.g., input output basic system or BIOS), and/or applications can be loaded in memory 1103 and executed by processor 1101. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1100 may further include IO devices such as devices 1105-1108, including network interface device(s) 1105, optional input device(s) 1107, and other optional IO device(s) 1107. Network interface device 1105 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1107 may include a mouse, a touch pad, a touch sensitive screen (which may be integrated with display device 1104), a pointer device such as a stylus, and/or a keyboard (e.g., physical keyboard or a virtual keyboard displayed as part of a touch sensitive screen). For example, input device 1106 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1107 may include an audio device. An audio device may include a speaker and/or a microphone to facilitate voice-enabled functions, such as voice recognition, voice replication, digital recording, and/or telephony functions. Other IO devices 1107 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1107 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1110 via a sensor hub (not shown), while other devices such as a keyboard or thermal sensor may be controlled by an embedded controller (not shown), dependent upon the specific configuration or design of system 1100.

To provide for persistent storage of information such as data, applications, one or more operating systems and so forth, a mass storage (not shown) may also couple to processor 1101. In various embodiments, to enable a thinner and lighter system design as well as to improve system responsiveness, this mass storage may be implemented via a solid state device (SSD). However, for other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1101, e.g., via a serial peripheral interface (SPI). This flash device may provide for non-volatile storage of system software, including a BIOS as well as other firmware of the system.

Storage device 1108 may include computer-accessible storage medium 1109 (also known as a machine-readable storage medium or a computer-readable medium) on which is stored one or more sets of instructions or software (e.g., module, unit, and/or logic 1128) embodying any one or more of the methodologies or functions described herein. Module/unit/logic 1128 may represent any of the components described above. Module/unit/logic 1128 may also reside, completely or at least partially, within memory 1103 and/or within processor 1101 during execution thereof by data processing system 1100, memory 1103 and processor 1101 also constituting machine-accessible storage media. Module/unit/logic 1128 may further be transmitted or received over a network via network interface device 1105.

Computer-readable storage medium 1109 may also be used to store some software functionalities described above persistently. While computer-readable storage medium 1109 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1128, components and other features described herein can be implemented as discrete hardware components or integrated in the functionality of hardware components such as ASICS, FPGAs, DSPs or similar devices. In addition, module/unit/logic 1128 can be implemented as firmware or functional circuitry within hardware devices. Further, module/unit/logic 1128 can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of profiling a user group, the method comprises:
periodically via a first thread executed by a first processor, obtaining event data from a task database system, the event data including a plurality of events of a plurality of tasks performed between a plurality of source user groups and a plurality of target user groups, wherein the plurality of source user groups have opted-in to sharing their task data and each source user group in the source user groups cannot access information in the task database that was received from another source user group,
wherein each task includes a plurality of stages, wherein each event corresponds to an activity performed by a particular source user group on a particular task with respect to a particular target user group within a predetermined time period in the past,
normalizing the plurality of events and the plurality of stages of the plurality of tasks, comprising:
for each of the source user groups, determining the greatest number of stages in a task process associated with the source user group;

determining an average number of stages across the plurality of source user groups using the determined greatest number of stages for each source user group; then generating a set of normalized stages having the determined average number of stages;

for each stage in the task process of each source user group, determining one or more events that are required to advance the task process to the next stage in the task process; then generating the set of normalized events for transitioning to a next stage of the set of normalized stages, using the determined events for each stage in the task process of each source user group; and for each of one or more stages of the task process of each source user group, matching the stage to a stage in the set of normalized stages by matching an event in the one or more events that are required to advance the task process of the source user group to an event in the set of normalized events that is associated with the matching stage in the set of normalized stages, extracting a set of task features of the plurality of tasks from the event data, wherein the set of task features identify stages of each task, a transition event of the stage, timing information from one stage to another stage of each task, and a completion rate of the tasks, and training an artificial intelligence (AI) model using the extracted set of task features as a training set of data, training the AI model comprises mapping the extracted stages of each task and the extracted transition event of the stage to a set of normalized stages and a set of normalized events for transitioning to a next stage of the set of normalized stages; and via a second thread executed by a second processor, receiving a request for profiling a first target user group from a client device over a network and the first target user group does not share its data, in response to the request, retrieving from the task database system a set of real-time event data corresponding to a set of recent events performed by one or more first source user groups on one or more tasks with respect to the first target user group, applying the AI model to a set of real-time task features extracted from the set of recent events to generate a first user group profile describing a behavioral pattern of the first user target group, the first user group profile comprising:

a projected duration of each stage of a potential task involved by the first target user group, and a contact information of one or more first target user group personnel associated with the stage of the potential task, wherein the generated first user group profile is shareable between the plurality of source user groups, and transmitting the first user group profile to the client device over the network.

2. The method of claim 1, wherein the set of task features extracted from the event data comprises a user identifier (ID) of each user of each source user group involved in each stage of each task and a user role of each user.

3. The method of claim 2, wherein the set of task features extracted from the event data further comprises a completion rate of past tasks involved by each user of each source user group.

4. The method of claim 1, wherein the set of task features extracted from the event data comprises duration of each stage of each of the plurality of tasks.

5. The method of claim 1, wherein the set of task features extracted from the event data comprises a size of each task.

6. The method of claim 1, wherein the set of task features extracted from the event data comprises a date and time stamp indicating when a piece of information in the event data was updated by a member of a corresponding source user group.

7. The method of claim 1, wherein the first target user group profile comprises a probability of advancing to a next stage of the potential task.

8. The method of claim 1, wherein the first target user group profile comprises:

a trend in change of duration of a transition time between one or more of the normalized stages;

one or more outlier instances in a change of the duration of a transition time between one or more of the normalized stages; or a seasonality of the duration of a transition time between one or more of the normalized stages.

9. The method of claim 1, wherein the task database system is configured to store task activity data for the source user group and is accessible by the source user groups, and wherein the first target user group profile is determined without having to contacting the first target user group.

10. The method of claim 1, wherein the AI model includes at least one of a hidden Markov model, an echo state network, or a Bayesian network.

11. A data processing system, comprising:

a processor; and a memory coupled to the processor to store instructions therein for profiling a user group, which when executed by the processor, cause the processor to perform operations, the operations including:

periodically via a first thread executed by a first processor, obtaining event data from a task database system, the event data including a plurality of events of a plurality of tasks performed between a plurality of source user groups and a plurality of target user groups, wherein the plurality of source user groups have opted-in to sharing their task data and each source user group in the source user groups cannot access information in the task database that was received from another source user group, wherein each task includes a plurality of stages, wherein each event corresponds to an activity performed by a particular source user group on a particular task with respect to a particular target user group within a predetermined time period in the past, normalizing the plurality of events and the plurality of stages of the plurality of tasks using comprising:

for each of the source user groups, determining the greatest number of stages in a task process associated with the source user group;

determining an average number of stages across the plurality of source user groups using the determined greatest number of stages for each source user group; then generating a set of normalized stages having the determined average number of stages;

for each stage in the task process of each source user group, determining one or more events that are required to advance the task process to the next stage in the task process; then generating the set of normalized events for transitioning to a next stage of the set of normalized stages, using the determined events for each stage in the task process of each source user group; and for each of one or more stages of the task process of each source user group, matching the stage to a stage in the set of normalized stages by matching an event in the one or more events that are required to advance the task process of the source user group to an event in the set of normalized events that is associated with the matching stage in the set of normalized stages, extracting a set of task features of the plurality of tasks from the event data, wherein the set of task features identify stages of each task, a transition event of the stage, timing information from one stage to another stage of each task, and a completion rate of the tasks, and training an artificial intelligence (AI) model using the extracted set of task features as a training set of data, training the AI model comprises mapping the extracted stages of each task and the extracted transition event of the stage to a set of normalized stages and a set of normalized events for transitioning to a next stage of the set of normalized stages; and via a second thread executed by a second processor,
receiving a request for profiling a first target user group from a client device over a network and the first target user group does not share its data, in response to the request, retrieving from the task database system a set of real-time event data corresponding to a set of recent events performed by one or more first source user groups on one or more tasks with respect to the first target user group, applying the AI model to a set of real-time task features extracted from the set of recent events to generate a first user group profile describing a behavioral pattern of the first user target group, the first user group profile comprising:
a projected duration of each stage of a potential task involved by the first target user group, and
a contact information of one or more first target user group personnel associated with the stage of the potential task, wherein the generated first user group profile is shareable between the plurality of source user groups, and
transmitting the first user group profile to the client device over the network.

12. The system of claim 11, wherein the set of task features extracted from the event data comprises a user identifier (ID) of each user of each source user group involved in each stage of each task and a user role of each user, and wherein the set of task features extracted from the event data comprises a duration of each stage of each of the plurality of tasks; a size of each task; and a date and time stamp indicating when a piece of information in the event data was updated by a member of a corresponding source user group.

13. The system of claim 11, wherein the first target user group profile comprises a probability of advancing to a next stage of the potential task and one or more of: a trend in change of duration of a transition time between one or more of the normalized stages; one or more outlier instances in a change of the duration of a transition time between one or more of the normalized stages; or a seasonality of the duration of a transition time between one or more of the normalized stages.

14. The system of claim 11, wherein the task database system is configured to store task activity data for the source user group and is accessible by the source user groups, and wherein the first target user group profile is determined without having to contacting the first target user group; and the AI model includes at least one of a hidden Markov model, an echo state network, or a Bayesian network.

15. A non-transitory computer-readable medium that stores instruction which, when executed by a processing system comprising at least one hardware processor, perform operations of profiling a user group, the operations comprising:

periodically via a first thread executed by a first processor,
obtaining event data from a task database system, the event data including a plurality of events of a plurality of tasks performed between a plurality of source user groups and a plurality of target user groups, wherein the plurality of source user groups have opted-in to sharing their task data and each source user group in the source user groups cannot access information in the task database that was received from another source user group, wherein each task includes a plurality of stages, wherein each event corresponds to an activity performed by a particular source user group on a particular task with respect to a particular target user group within a predetermined time period in the past, normalizing the plurality of events and the plurality of stages of the plurality of tasks, comprising:
for each of the source user groups, determining the greatest number of stages in a task process associated with the source user group;
determining an average number of stages across the plurality of source user groups using the determined greatest number of stages for each source user group; then
generating a set of normalized stages having the determined average number of stages;
for each stage in the task process of each source user group, determining one or more events that are required to advance the task process to the next stage in the task process; then
generating the set of normalized events for transitioning to a next stage of the set of normalized stages, using the determined events for each stage in the task process of each source user group; and
for each of one or more stages of the task process of each source user group, matching the stage to a stage in the set of normalized stages by matching an event in the one or more events that are required to advance the task process of the source user group to an event in the set of normalized events that is associated with the matching stage in the set of normalized stages, extracting a set of task features of the plurality of tasks from the event data, wherein the set of task features identify stages of each task, a transition event of the stage, timing information from one stage to another stage of each task, and a completion rate of the tasks, and training an artificial intelligence (AI) model using the extracted set of task features as a training set of data, training the AI model comprises mapping the extracted stages of each task and the extracted transition event of the stage to a set of normalized stages and a set of normalized events for transitioning to a next stage of the set of normalized stages; and via a second thread executed by a second processor,
  receiving a request for profiling a first target user group from a client device over a network and the first target user group does not share its data,
  in response to the request, retrieving from the task database system a set of real-time event data corresponding to a set of recent events performed by one or more first source user groups on one or more tasks with respect to the first target user group,
  applying the AI model to a set of real-time task features extracted from the set of recent events to generate a first user group profile describing a behavioral pattern of the first user target group, the first user group profile comprising:
    a projected duration of each stage of a potential task involved by the first target user group, and
    a contact information of one or more first target user group personnel associated with the stage of the potential task,
  wherein the generated first user group profile is shareable between the plurality of source user groups, and
  transmitting the first user group profile to the client device over the network.

16. The medium of claim 15, wherein the set of task features extracted from the event data comprises a user identifier (ID) of each user of each source user group involved in each stage of each task and a user role of each user, and wherein the set of task features extracted from the event data comprises a duration of each stage of each of the plurality of tasks; a size of each task; and a date and time stamp indicating when a piece of information in the event data was updated by a member of a corresponding source user group.

17. The medium of claim 15, wherein the first target user group profile comprises an event that the first target group uses to determine advancement to a next stage of the potential task, a probability of advancing to a next stage of the potential task, and one or more of: a trend in change of duration of a transition time between one or more of the normalized stages, one or more outlier instances in a change of the duration of a transition time between one or more of the normalized stages, or a seasonality of the duration of a transition time between one or more of the normalized stages.

18. The medium of claim 15, wherein the task database system is configured to store task activity data for the source user group and is accessible by the source user groups, and wherein the first target user group profile is determined without having to contacting the first target user group; and the AI model includes at least one of a hidden Markov model, an echo state network, or a Bayesian network.

19. The method of claim 1, wherein the method further comprises via the second thread executed by the second processor,
  determining a deliverable and a timing of the deliverable requested by the first target user group associated with the stage of the potential task.

20. The method of claim 1, wherein the method further comprises via the second thread executed by the second processor,
  store the generated first user group profile in a model storage; and
  periodically update the stored first user group profile based on a most recent update to the task database system.

21. The method of claim 1, wherein the contact information comprises a task contact who specifically handles the stage of the potential task.

22. The method of claim 1, wherein the method further comprises periodically via the first thread executed by the first processor,
  extracting from the event data a contact information from communications that occur between target and each source user group.

* * * * *